United States Patent

Damask et al.

[11] Patent Number: 5,915,051
[45] Date of Patent: *Jun. 22, 1999

[54] WAVELENGTH-SELECTIVE OPTICAL ADD/ DROP SWITCH

[75] Inventors: Jay N. Damask, Cambridge; Thomas E. Murphy, Somerville; Juan Ferrera, Boston; Michael Hong Yeol Lim, Cambridge; Henry I. Smith, Sudbury; Hermann A. Haus, Lexington, all of Mass.

[73] Assignee: Massascusetts Institute of Technology, Cambridge, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/792,916

[22] Filed: Jan. 21, 1997

[51] Int. Cl.$^6$ .................................................. G08B 6/28
[52] U.S. Cl. .................................. 385/16; 385/9; 385/14; 385/24; 359/128
[58] Field of Search .................................... 359/128, 124, 359/125, 130, 127; 385/16, 24, 14, 8, 9, 10

[56] References Cited

U.S. PATENT DOCUMENTS

| | | | |
|---|---|---|---|
| 4,852,960 | 8/1989 | Alferness et al. | 350/96.19 |
| 4,900,119 | 2/1990 | Hill et al. | 350/96.15 |
| 5,136,169 | 8/1992 | Smith et al. | 250/491.1 |
| 5,195,161 | 3/1993 | Adar et al. | 385/129 |
| 5,303,078 | 4/1994 | Brackett et al. | 359/128 |
| 5,311,605 | 5/1994 | Stewart | 385/27 |
| 5,319,482 | 6/1994 | Tsuchiya et al. | 359/128 |
| 5,319,485 | 6/1994 | Yasui et al. | 359/128 |
| 5,341,444 | 8/1994 | Henry et al. | 385/11 |
| 5,471,551 | 11/1995 | Kragl et al. | 385/37 |

(List continued on next page.)

OTHER PUBLICATIONS

Kazarinov et al., "Narrow–Band Resonant Optical Reflectors and Resonant Optical Transformers for Laser Stabilization and WDM," *IEEE Jnl. Qtm. Elect.*, V. QE–23, N. 9, pp. 1419–1425, Sep. 1987.

Henry et al., "A Narrow–Band $Si_3N_4$—$SiO_2$ Resonant Optical Reflector," *IEEE Jnl. Qtm. Elect.*, V. QE–23, N. 9, pp. 1426–1428, Sep. 1987.

(List continued on next page.)

*Primary Examiner*—Hung N. Ngo
*Attorney, Agent, or Firm*—Theresa A. Lober

[57] ABSTRACT

A wavelength-selective optical switch having a first input port for accepting a plurality of copropagating optical channels, each of the channels having a distinct wavelength band. The optical switch includes first and second output ports. A wavelength-selective optical filter is connected to receive the copropagating optical channels from the first input port to extract a selected one of the channels while allowing the remaining channels to copropagate to the first output port. An interferometric switch is connected to receive the selected extracted channel; the interferometric switch includes a controller for controlling propagation of the selected extracted channel to either the second output port, the optical filter, or both. The optical filter is connected to receive from the interferometric switch an optical channel to be combined with the remaining copropagating channels and all directed to the first output port. In a first control state of the controller, the interferometric switch is adapted to direct the selected extracted channel to the optical filter, while in a second control state of the controller, the interferometric switch is adapted to direct the selected extracted channel to the second output port. A second input port can be provided for accepting an injected optical channel having a wavelength band corresponding to the wavelength band of the selected extracted channel. This second input port is connected to direct the injected optical channel to the interferometric switch. In this scenario, the interferometric switch is adapted, in the second control state of the controller, to direct the injected channel to the optical filter, and is adapted to direct the injected channel, in a first control state of the controller, to the second output port.

28 Claims, 16 Drawing Sheets

U.S. PATENT DOCUMENTS

| | | | |
|---|---|---|---|
| 5,500,916 | 3/1996 | Cirelli et al. | 385/37 |
| 5,504,827 | 4/1996 | Schimpe | 385/24 |
| 5,668,652 | 9/1997 | Hashomoto et al. | 359/125 |
| 5,748,811 | 5/1998 | Amersfoort et al. | 385/15 |

OTHER PUBLICATIONS

Olsson et al., "Narrow linewidth 1.5 μm semiconductor laser with a resonant optical reflector," *Appl. Phys. Lett.,* V. 51, N. 15, pp. 1141–1142, Oct. 12, 1987.

Haus et al., "Narrow–Band Distributed Feedback Reflector Design," *Jnl. Lightwave Tech.,* V. 9, N. 6, pp. 754–760, Jun. 1991.

Hirata et al., "Monolithic resonant optical reflector laser diodes," *Electronics Letts.,* V. 27, N. 22, pp. 2050–2051, Oct. 24, 1991.

Haus et al., "Narrow–Band Optical Channel–Dropping Filter," *Jnl. Lightwave Tech.,* V. 10, N. 1, pp. 57–62, Jan. 1992.

Damask et al., "Wavelength–Division Multiplexing using Channel–Dropping Filters," *Jnl. Lightwave Tech.,* V. 11, N. 3, pp. 424–428, Mar. 1993.

Damask et al., "Limitations/Solutions for the Use of Integrated λ/4–Shifted Distributed Bragg Resonators in WDM Appls.," *Int. Symp. Int. Optics,* SPIE, Lindau, Germany, Apr. 1994.

Wong et al., "Spatial–phase–locked electron–beam lith. and x–ray lith. for fabricating first–order gratings on rib waveguides," *J. Vac. Sci. Tech.* B, V, 12, N. 6, pp. 3741–3745, Nov. 1994.

Haus et al, "Distributed Feedback Channel Dropping Filters," in *Guided–Wave Optoelectronics,* Tamir et al., Editors, pp. 299–311, Plenum Press, New York, 1995.

Damask et al, "Integrated Resonant Channel–Dropping Filters: Fabrication Paradigms and Preliminary Results," *Abstract in NCIPT Annual Rev. of Photonics,* Santa Monica, CA, Feb. 1995.

Damask et al., "Highly coherent E–beam–written quarter–wave–shifted distributed Bragg resonators for channel–dropping filters," *OFC '95 Tech. Digest Conf. Ed.* V. 8, pp. 225–226, Feb. 1995.

Damask et al., "Highly coherent E–beam–written quarter–wave–shifted distributed Bragg resonators for channel–dropping filters," Slides presented at *OFC '95,* San Diego, CA, Feb. 1995.

Damask et al., "Overcoming Obstacles to Design and Fabricate Integrated Resonant Channel–Dropping Filters," *David Sarnoff Research Center: Sarnoff Symp.,* Princeton, NJ, Apr. 1995.

Wong et al., "Distributed Bragg grating integrated–optical filters: Synthesis and fabrication," *J. Vac. Sci. Technol. B,* V. 13, N. 6, pp. 2859–2864, Nov. 1995.

Damask et al., "Narrow–Band Optical Filters and Circuits," Abstract in *NCIPT Annual Review of Photonics,* Santa Monica, CA, Feb. 1996.

Damask et al., "Narrow–Band Optical Filters and Circuits," Slides presented at *NCIPT Annual Review of Photonics,* Santa Monica, CA, Feb. 1996.

Bilodeau et al., "Broadband wavelength–select. tap using an all–fiber Mach–Zehnder interferom. & chirped photo–induced Bragg gratings," *OFC '96 Tech. Dig. Con. Ed.* V. 2, p. 119–120, Feb. 1996.

Quetel et al., "Programmable filter grating based wavelength demultiplexer," *OFC '96 Tech. Dig., Conf. Ed.,* V. 2, pp. 120–121, Feb. 1996.

Glance et al., "Novel optically restorable WDM ring network," *OFC '96 Tech. Dig., Conf. Ed.,* V. 2, pp. 216–218, Feb. 1996.

Perrier et al., "4–channel, 10–Gbit/s capacity self–healing WDM ring network with wavelength add/drop multiplexers," *OFC '96 Tech. Dig. Conf. Ed.,* V. 2, pp. 218–220, Feb. 1996.

Khrais et al., "Effect of cascaded misaligned optical (de)multiplexers on multiwavelength optical network performance," *OFC '96 Tech. Dig. Conf. Ed.,* V. 2, pp. 220–221, Feb. 1996.

Kohnke et al., "Planar waveguide Mach–Zender bandpass filter fabricated with single exposure UV–induced gratings," *OFC '96 Tech. Dig., Conf. Ed.,* V. 2, p. 277, Feb. 1996.

Damask "Integrated–Optic Grating–Based Filters For Optical Communication Systems," Ph.D. Thesis, Massachusetts Institute of Technology, May 1996.

Damask, "Practical Design of Side–Coupled Quarter–Wave Shifted Distributed–Bragg Resonant Filters," *Jnl. Lightwave Tech.,* V. 14, N. 5, pp. 812–821, May 1996.

Tachikawa et al., "Arrayed–Waveguide Grating Multiplexer with Loop–Back Optical Paths and Its Applications," *Jnl. Lightwave Tech.,* V. 14, N. 6, pp. 977–983, Jun. 1996.

Chang et al., "Multiwavelength Reconfigurable WDM/ATM/SONET Network Testbed," *Jnl. Lightwave Tech.,* V. 14, N. 6, pp. 1320–1340, Jun. 1996.

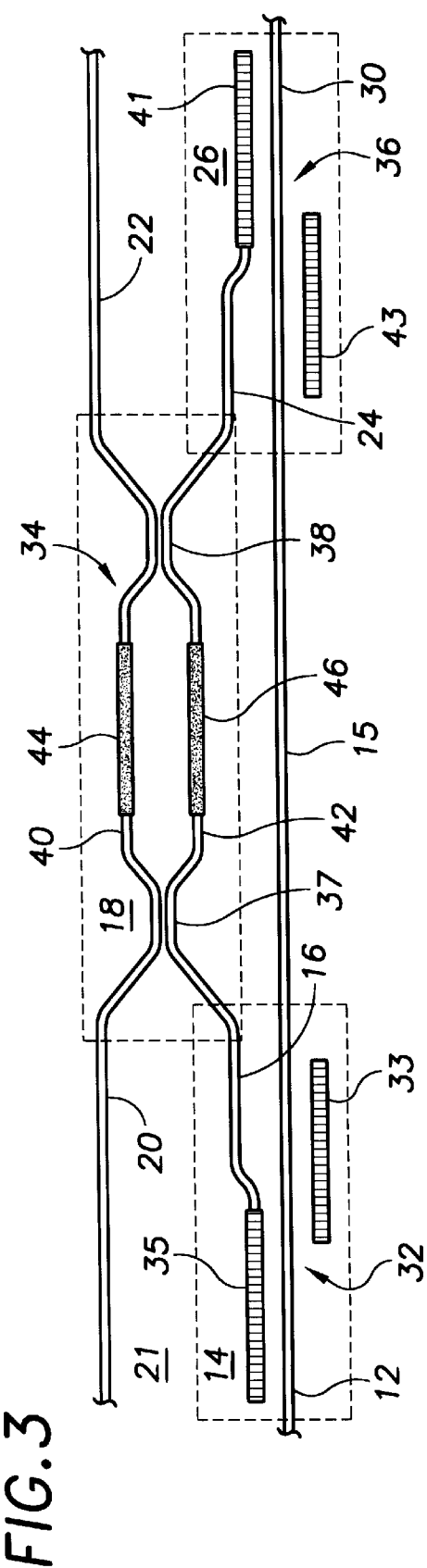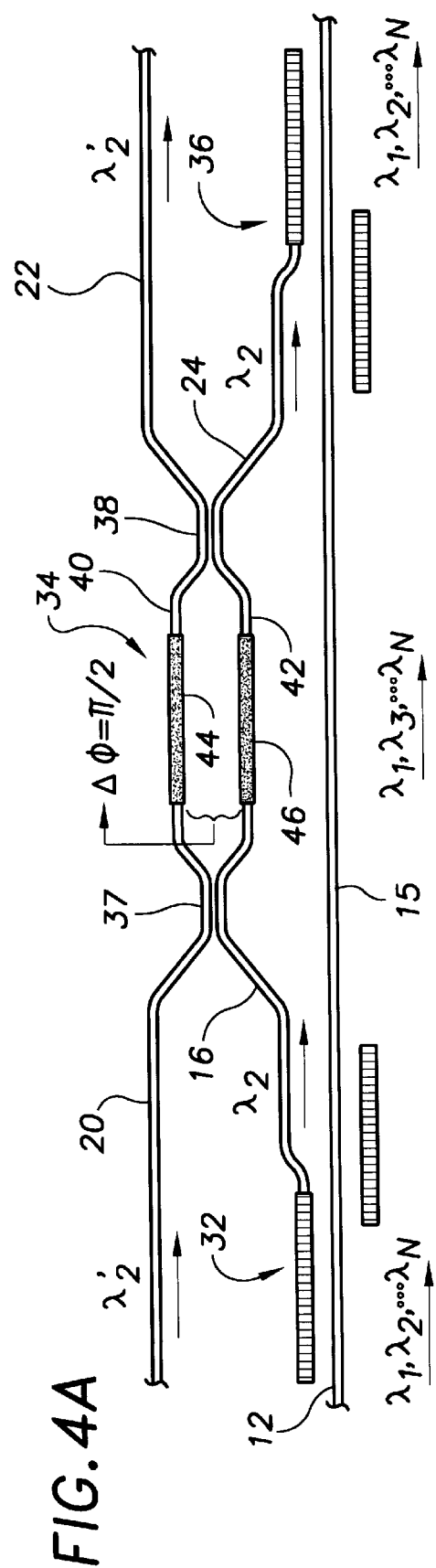
FIG.3
FIG.4A

WAVELENGTH-SELECTIVE OPTICAL ADD/DROP SWITCH

GOVERNMENT RIGHTS IN THE INVENTION

The United States Government has rights to this invention pursuant to ARPA Contract No. MDA972-94-1-0001.

BACKGROUND OF THE INVENTION

This invention relates to techniques for routing optical wavelengths, and more particularly relates to wavelength-selective optical routing and switching techniques.

The increasing use of all-optical fiber networks as backbones for global communication systems has been based in large part on the extremely wide optical transmission bandwidth provided by optical fiber. This has accordingly led to an increased demand for the practical utilization of the full optical fiber bandwidth available, to, for example, increase communication system user capacity. In the prevailing manner for exploiting optical fiber bandwidth, wavelength-division multiplexing (WDM) and wavelength-division demultiplexing (WDD) techniques are employed to enable the simultaneous transmission of multiple independent optical data streams, each of a distinct wavelength, on a single optical fiber, with wavelength-selective WDM and WDD control provided for coupling of the multiple data streams with the optical fiber on a wavelength-specific basis. With this capability, a single optical fiber can be configured to simultaneously transmit several optical data streams, e.g., ten optical data streams, that each might not exceed, say, 10 Gb/s, but that together represent an aggregate optical fiber transmission bandwidth of more than, say, 100 Gb/s.

In order to increase the aggregate transmission bandwidth of an optical fiber, it is generally preferred that the spacing of simultaneously transmitted optical data streams, or optical data "channels," be closely packed, to accommodate a larger number of channels. In other words, the difference in wavelength between two adjacent channels is preferably minimized. Current transmission standards require accommodation of 100 GHz, corresponding to 0.8 nm, separation between adjacent channels, and in some applications, channel separation is preferably reduced to 50 GHz.

This desire for closely-spaced optical transmission channels results in the need for fine wavelength resolution and thereby complicates the wavelength-selective WDM and WDD operations required for simultaneous transmission of the channels. Historically, the well-known Dragone filter design has been employed to perform wavelength-selective WDM and WDD operations with a reasonable degree of wavelength resolution. The Dragone filter functions in the manner of a discrete prism to resolve all transmission channel wavelengths incident at its input into spatially separated transmission channels. Once spatially separated, one or more of the transmission channels can then be extracted, or dropped, from the set of channels. Two Dragone filters can be configured in back-to-back fashion to enable resolution of all transmission channels, dropping of a selected one or more channels, and then injection of substitute channels and recombination for simultaneous transmission.

The use of Dragone filters in this manner for wavelength-specific, single channel WDM and WDD operations is problematic in that the size of the filter structure, which is microfabricated, typically exceeds about 2 cm$^2$, a size that is increasingly becoming hard to accommodate as overall optical transmission system componentry size shrinks in response to cost considerations. Inter-channel crosstalk can also occur during the resolution and recombination operations, resulting in echoes of a removed channel at the recombined output.

Use of a Dragone filter for wavelength-specific, single channel operations at, e.g., a wavelength-specific user node on an optical communications network, is inefficient in that all copropagating channels must be spatially separated to extract only the single channel of interest to the node. As new wavelengths are added to the communications network, the Dragone filters employed at each of the nodes must accordingly be replaced to accommodate spatial separation of added wavelengths. These limitations of the Dragone filter generally characterize the insufficiency of conventional all-optical wavelength-selective routing techniques in meeting the increasingly complex requirements of optical networks.

SUMMARY OF THE INVENTION

The invention overcomes limitations of prior optical filters by providing a wavelength-selective optical switch. The optical switch includes a first input port for accepting a plurality of copropagating optical channels; each of the channels has a distinct wavelength band. The optical switch further includes a first output port and a second output port. A wavelength-selective optical filter is connected to receive the copropagating optical channels from the first input port to extract a selected one of the channels while allowing remaining channels to copropagate to the first output port. An interferometric switch is connected to receive the selected extracted channel; the interferometric switch includes a controller for controlling propagation of the selected extracted channel to either the second output port, the optical filter, or both. The optical filter is connected to receive from the interferometric switch an optical channel to combine the received channel with the remaining copropagating channels and direct the combined channels to the first output port.

In a first control state of the controller, the interferometric switch is adapted to direct the selected extracted channel to the optical filter, while in a second control state of the controller, the interferometric switch is adapted to direct the selected extracted channel to the second output port.

This optical switch configuration and operation enables wavelength-selective extraction of a single optical channel of interest while enabling other optical channels of interest to continue propagating, i.e., without the need for spatial separation of each and every channel. The selected channel of interest can be extracted and controllably directed either back with the other copropagating channels, or to a second output of the switch.

In one embodiment of the invention, a second input port is provided for accepting an injected optical channel having a wavelength band corresponding to the wavelength band of the selected extracted channel. This second input port is connected to direct the injected optical channel to the interferometric switch. In this scenario, the interferometric switch is adapted, in the second control state of the controller, to direct the injected channel to the optical filter, and is adapted to direct the injected channel, in a first control state of the controller, to the second output port.

In one example implementation, the first input port and the first output port each provide a connection to a first optical communication bus on which the plurality of optical channels copropagate and from which a first data stream at the selected channel is to be alone extracted. In addition, the second input port and the second output port can here each provide a connection to a second optical communication bus on which a second plurality of optical channels copropagate and from which a second data stream at the injected optical channel is to be extracted.

In preferred embodiments, the interferometric switch includes a first waveguide coupling region and a second waveguide coupling region, with first and second interferometer arms connected between the first and second waveguide coupling regions. The first waveguide coupling region has a first waveguide connected to accept the selected extracted channel from the optical filter and a second waveguide connected to accept an injected channel from the second input port. The second coupling region has a third waveguide connected to direct one of either the injected channel and the selected extracted channel to the optical filter and a fourth waveguide connected to direct one of either the injected channel and the selected extracted channel to the second output port.

In further embodiments, the controller is an optical phase controller that is in communication with at least one of the first and second interferometer arms. Here the controller is adapted to impose, in the first control state, a first selected relative phase shift between optical channels propagating on the first and second interferometer arms. This first relative phase shift is selected to result in directing of the selected extracted channel to the optical filter from the interferometer switch. The phase controller is further adapted to impose, in the second control state, a second selected relative phase shift between channels propagating on the first and second interferometer arms. The second relative phase shift is selected to result in directing of the selected extracted channel to the second output port from the interferometer switch.

In preferred embodiments, the optical filter includes a first optical filter connected to receive the copropagating optical channels from the first input port to extract the selected channel and direct the extracted selected channel to the first waveguide of the first interferometric switch coupling region while allowing the remaining channels to copropagate through the first optical filter. The filter also includes a second optical filter connected to receive the remaining channels that copropagate through the first optical filter. This second optical filter is also connected to receive from the third waveguide of the second interferometric switch coupling region one of the selected extracted channel and the injected channel to be combined with the remaining copropagating channels. It is also connected to direct the combined channels to the first output port.

Preferably, the first optical filter includes a first center waveguide connected to the first input port, with a first optical receiver resonator located in side-by-side evanescent coupling proximity to the first center waveguide. The first optical receiver resonator is connected to the first waveguide of the first interferometric switch coupling region. A first optical reflector resonator is also located in side-by-side evanescent coupling proximity to the first center waveguide but following the first optical receiver resonator. An optical path length along the first center waveguide is defined to be an integral multiple of half-resonant wavelengths plus one quarter resonant wavelength; this path length is defined between a phase reference point on the first receiver resonator and an equivalent phase reference point on the first reflector resonator.

Similarly, the second optical filter preferably includes a second center waveguide connected at a first end to receive the remaining copropagating channels from the first center waveguide, as well as being connected at a second end to the first output port. A second optical reflector resonator is located in side-by-side evanescent coupling proximity to the second waveguide, and an optical transmitter resonator is connected to the third waveguide of the second interferometric switch coupling region and located in side-by-side evanescent coupling proximity to the second waveguide, following the second optical reflector resonator. An optical path length is defined along the second center waveguide to be an integral multiple of half-resonant wavelengths plus one quarter resonant wavelength; this path length being defined between a phase reference point on the second reflector resonator and an equivalent phase reference point on the transmitter resonator.

In preferred embodiments, the first and second optical reflector resonators, the first receiver resonator, and the transmitter resonator all are Bragg gratings that are each characterized by a grating period and a Bragg wavelength that is selected to correspond to the wavelength band of the selected extracted channel. Here the phase reference point of each of the Bragg gratings is a spacer portion at a point along that grating for producing a quarter-wave shift in an optical phase of an optical channel that propagates along that grating. The Bragg gratings are preferably each characterized by a resonant spectral linewidth that is at least as wide as the wavelength band of the selected extracted channel but that does not substantially overlap with the wavelength band of each optical channel adjacent to the selected extracted channel in the plurality of channels. Preferably, the proximity of each of the gratings to the corresponding center waveguide is characterized by a minimum proximity for that grating, with the minimum proximity corresponding to the point along that grating at which the quarter-wave shift spacer portion is located.

In other embodiments, an optical loss resonator Bragg grating is provided in side-by-side evanescent coupling proximity to the second center waveguide between the first reflector resonator and the second reflector resonator. Like the other gratings, the loss resonator Bragg grating has a Bragg period corresponding to the wavelength band of the selected extracted channel and has a spacer portion at a point along that grating for producing a quarter-wave shift in an optical phase of an optical channel that propagates along that grating. Each grating length on either side of the spacer portion is characterized by a grating arm length that is sufficiently short to enable optical energy coupled to the grating arms to escape from an outer end of the arm.

A third optical filter is provided in other embodiments; this third optical filter includes a second optical receiver resonator located in side-by-side evanescent coupling proximity to the second center waveguide between the first and second optical reflector resonators, and includes a third optical reflector resonator located in side-by-side evanescent coupling proximity to the second center waveguide following the second optical receiver resonator and before the second optical reflector resonator. An optical path length is defined along the second center waveguide to be an integral multiple of half-resonant wavelengths plus one quarter resonant wavelength, the path length extending between a phase reference point on the second receiver resonator and an equivalent phase reference point on the third reflector resonator. Preferably, the second receiver resonator and the third reflector resonator each are Bragg gratings characterized by a grating period and a Bragg wavelength that is selected to correspond to the wavelength band of the selected extracted channel. The phase reference point of each of the Bragg gratings preferably is a spacer portion at a point along that grating for producing a quarter-wave shift in an optical phase of an optical channel that propagates along that grating.

In another embodiment, the third optical filter includes a second optical receiver resonator located in side-by-side evanescent coupling proximity to the second center waveguide between the first and second optical reflector resonators, and the second optical reflector resonator. Here an optical path length is defined along the second center waveguide to be an integral multiple of half-resonant wavelengths plus one quarter resonant wavelength and extending between a phase reference point on the second receiver resonator and an equivalent phase reference point on the second reflector resonator. As in the other third optical filter embodiment, it is here preferred that the second receiver resonator be a Bragg grating characterized by a grating period and a Bragg wavelength selected to correspond to the wavelength band of the selected extracted channel, with the phase reference point of the Bragg grating being a spacer portion at a point along that grating for producing a quarter-wave shift in an optical phase of an optical channel that propagates along that grating.

In other embodiments, there is provided an amplifying element connected to at least one of the first, second, third, and fourth coupling waveguides of the interferometric switch coupling regions. In other embodiments there is provided a first detector waveguide located in side-by-side evanescent coupling proximity to the third coupling waveguide of the second coupling region of the interferometric switch. A corresponding first photodetector is connected to the first detector waveguide for producing a first signal corresponding to intensity characteristics of light coupled to the first detector waveguide. Similarly, there is provided a second detector waveguide located in side-by-side evanescent coupling proximity to the fourth coupling waveguide of the second coupling region of the interferometric switch. A corresponding second photodetector is connected to the second detector waveguide for producing a second signal corresponding to intensity characteristics of light coupled to the second detector waveguide. A second controller is provided for controlling the phase controller of the interferometric switch based on the first and second photodetector signals.

In other embodiments, the optical filter is a single-channel interferometric reflection filter and includes a first waveguide coupling region, a second waveguide coupling region, and first and second interferometer arms connected between the first and second waveguide coupling regions. Each of the arms has an identical Bragg reflector that is characterized by a selected Bragg period corresponding to the wavelength band of the selected channel to be extracted. The first waveguide coupling region has a first waveguide connected to accept from the first input port the copropagating channels and a second waveguide connected to deliver the selected extracted channel to the first waveguide of the first coupling region of the interferometric switch. The second coupling region has a third waveguide connected to accept one of the selected extracted channel and the injected channel from the third waveguide of the second coupling region of the interferometric switch and a fourth waveguide connected to direct the copropagating channels and one of the injected channel and the selected extracted channel to the second output port. The first waveguide of the reflection filter first coupling region and the fourth waveguide of the reflection filter second coupling region are connected by one of the two reflection filter arms.

In a further embodiment, the optical filter includes a length of optical waveguiding fiber having a Bragg reflector along the fiber length. The reflector is characterized by a selected Bragg period corresponding to the wavelength band of the selected channel to be extracted. A first optical circulator is provided having a first port connected to receive the copropagating channels from the first input port, a second port connected to a first end of the optical fiber length, and a third port connected to the first waveguide of the first coupling region of the interferometric switch. A second optical circulator is correspondingly provided, having a first port connected to the first output port, a second port connected to a second end of the optical fiber, and a third port connected to the third waveguide of the second coupling region of the interferometric switch. For each of the first and second optical circulators, optical input to the first port and optical input to the third port is directed to the second port, while reflection at the second port of an optical input from the first port is directed to the third port, and reflection at the second port of an optical input from the third port is directed to the first port. As a result, the plurality of copropagating channels from the first input port are directed to the fiber first fiber end by the first circulator, and the selected channel to be extracted is reflected to the first fiber end and directed by the first circulator to the first waveguide of the first interferometric switch coupling region. A channel from the third waveguide of the interferometric switch second coupling region is directed by the second circulator to the second fiber end, reflected with the remaining copropagating channels to the second circulator, and directed by the second circulator to the first output port.

The invention provides a process for fabricating each of the Bragg gratings and corresponding Bragg grating waveguides on which the gratings are located. In the fabrication, a lower cladding dielectric layer is first formed on a substrate, and then a core dielectric layer is formed on the lower cladding dielectric layer. The selected core dielectric layer having a higher refractive index than the lower cladding dielectric layer. On the core dielectric layer is formed a lithographically-defined pattern corresponding to the Bragg gratings. Then is formed on the patterned core dielectric layer a first hard mask layer having a lithographically-defined pattern corresponding to the Bragg grating pattern. Next, a second hard mask layer is formed on the patterned first hard mask layer. The first and second hard mask layers are of materials that are each characterized as being etchable by an etching process that does not etch the other hard mask material or the core layer. The second hard mask layer is then lithographically patterned in a pattern that corresponds to the grating waveguides and that is aligned to the Bragg grating pattern on the first hard mask layer. The first hard mask layer is etched, using the second hard mask layer mask pattern, to expose an upper surface of the core layer in regions of the core layer not covered by a waveguide pattern of the second hard mask while preserving the first hard mask layer in all regions of the first hard mask layer covered by the waveguide pattern of the second hard mask. Then the core dielectric layer is etched to produce grating waveguides under the layered first and second patterned hard mask layers. The second hard mask layer is stripped, and then the core layer waveguides are etched to produce Bragg gratings on the waveguides. The first hard mask layer is stripped, and then an upper cladding dielectric layer is formed on the etched core layer. The upper cladding dielectric layer having a lower index of refraction than the core dielectric layer.

In preferred fabrication processes, the step of forming on the core layer a lithographic pattern corresponding to the Bragg gratings is accomplished by first forming a photoresist layer on the core layer and then exposing the photoresist layer to x-rays through an x-ray or a phase mask having a grating pattern produced on the mask by spatial-phase-locked e-beam lithography.

Preferably, the upper and lower cladding dielectric layers each are formed of a layer of indium phosphide and the core layer is formed of at least one layer of indium gallium arsenide phosphide. Alternatively, the substrate is preferably formed of a material selected from the group of silicon, quartz, and sapphire, the upper and lower cladding dielectric layers each are formed of a layer of material of substantially silicon dioxide, and the core dielectric layer is formed of a layer of material selected from phosphorus-doped and germanium-doped silicon dioxide.

The optical switch design and operation, and the optical switch fabrication processes, all provided by the invention, enable a compact, cost-effective wavelength-selective all-optical switch that advances the potential for wavelength-selective optical communication networks which rely on efficient and cost-effective routing and switching of selected multiplexed channels at various nodes in the network. Other features and advantages of the optical switch of the invention will be apparent from the claims, and from the following description and accompanying figures.

BRIEF DESCRIPTION OF THE DRAWINGS

FIG. 3 is an example implementation in accordance with the invention of the class of add/drop switches of FIG. 2;

FIG. 4A is a schematic diagram of the switch implementation of FIG. 3 in a first control state;

DETAILED DESCRIPTION OF THE INVENTION

Figure 1:
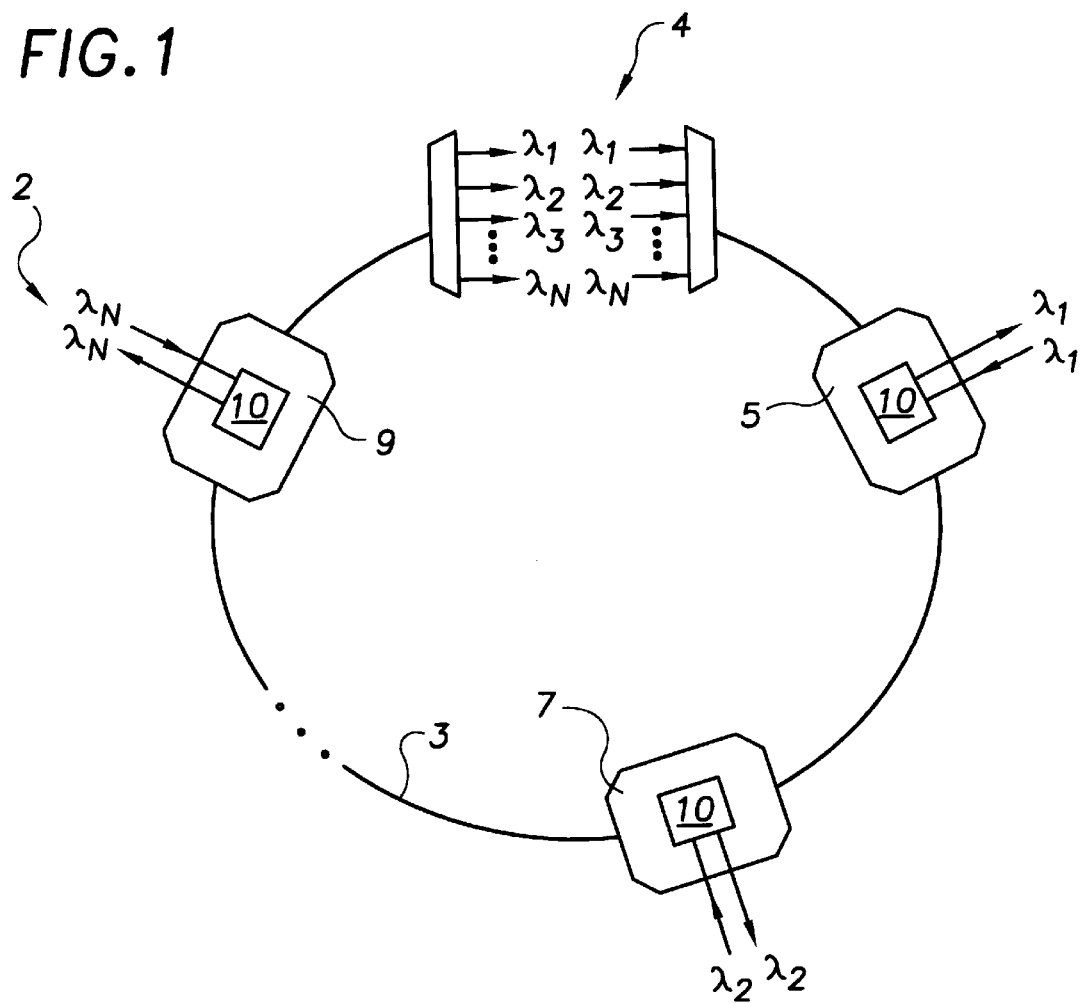
FIG. 1 is a schematic diagram of an optical ring local area network including wavelength-selective user nodes at each of which the add/drop switch of the invention can be employed.

Referring to FIG. 1 there is shown an example optical network, namely, a multi-wavelength optical ring local area network (LAN) 2, in which the wavelength-selective add/drop optical switch of the invention can be employed. The optical LAN is configured, as is conventional, using an optical fiber 3 connected between a hub, or administrative, node 4 and a plurality of distributed user nodes 5, 7, 9, in a ring formation. Each user node is assigned a distinct and narrow optical wavelength band, hereinafter referred to as a channel, for transmission of data over the network at the assigned wavelength channel. With WDM and WDD administrative operations provided by the hub node, each user node can then tap into the optical fiber multi-wavelength transmission stream to extract as well as inject data with the assurance of a channel that is dedicated to that node's transmission.

As shown in the figure, at the hub node 4 all optical wavelength channels transmitted by the fiber, i.e., wavelength channels of $\lambda_1$ to $\lambda_N$, may be resolved and extracted to undertake various administrative, WDM, and WDD operations. But at each user node, e.g., a first user node 5, only the corresponding wavelength channel assigned to that user node, here $\lambda_1$, is of interest to the user node. In accordance with the invention, the optical add/drop switch 10 of the invention is configured with the user node to enable extraction of the wavelength channel of interest at the node without requiring resolution of the other wavelength channels also being transmitted. For example, at the first user node 5 the optical add/drop switch 10 enables extraction of the optical transmission channel at the $\lambda_1$ wavelength and injection of new or additional data back into the LAN for transmission at the $\lambda_1$ wavelength. Similarly, at the second user node 7 the optical add/drop switch 10 enables extraction of the optical transmission channel at the $\lambda_2$ wavelength and injection into the LAN of data at the $\lambda_2$ wavelength, and so on, extending to the last, or $N^{th}$, user node, for which the optical add/drop switch 10 enables extraction of the optical transmission channel at the $\lambda_N$ wavelength and injection of data at the $\lambda_N$ wavelength.

The wavelength selectivity enabled by the optical switch of the invention is provided, as explained in detail below, in a compact and correspondingly low-cost device that advances the practical realization of very large multi-wavelength LANs, or even multi-wavelength wide area networks (WANs) in which distributed network user communication is wavelength-specific to the user and thus in which full resolution of transmission wavelengths at each user node is unnecessary and inefficient. Various embodiments of the optical add/drop switch of the invention will be discussed below, along with operational and design parameters, as well as fabrication considerations.

Figure 2:
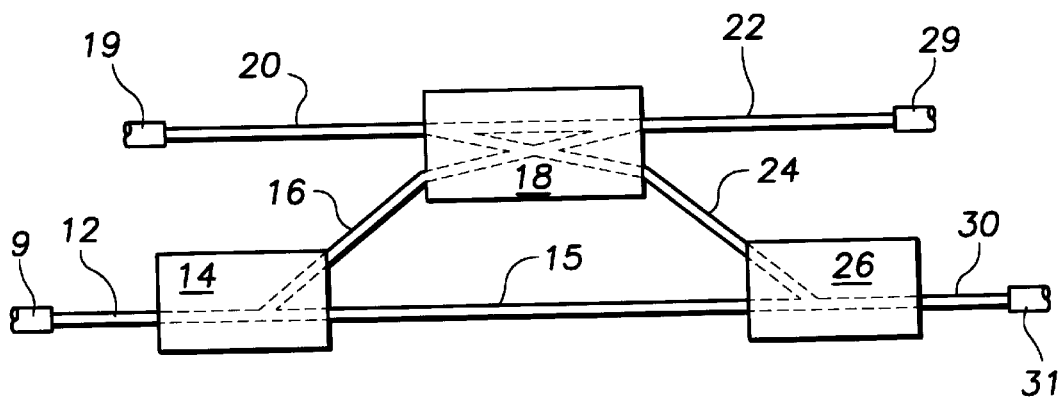
FIG. 2 is a schematic diagram of a first class of add/drop switches provided by the invention.

Referring to FIG. 2, a first class of wavelength-specific add/drop optical switches provided by the invention is characterized as a four port device that can both extract a specific channel as well as inject that channel using wavelength-selective optical filters. The schematic representations of the switch components as shown in the figure are provided to indicate the components' functionality and are not literal representations. The first of the switch ports is a multi-wavelength input 9; in the LAN just described, such an input would be interfaced with the network fiber 3 at a user node. The multi-wavelength input 9 is connected to a first input waveguide 12 capable of supporting all channels input to it. At a point along the input waveguide 12 is located a wavelength-selective filter 14 which is preconfigured to couple one channel, of a selected wavelength band, from the input waveguide to a branching waveguide 16 while at the same time enabling all of the remaining channels to copropagate along a next waveguide section 15. The wavelength-selective filter 14 thus functions as a spatial filter that drops a preselected channel from the waveguide while continuing to transmit all other channels.

The dropped channel is directed to a spatial switch 18 which is configured to additionally accept from a second input 19 and second input waveguide 20 a second optical channel, which in most applications is preferably of a wavelength band having a center frequency identical to that of the dropped channel. The spatial switch 18 is controllable between two switch states that set the output of the spatial switch 18 in one of two possible configurations. Specifically, in a first controllable switch state, the spatial switch 18 directs the dropped channel to a branching waveguide 24 and on to a second filter 26 that injects, or adds, the dropped channel back with the copropagating channels for copropagation in a first output waveguide 30 and a first output 31, connected to, e.g., an optical fiber in a LAN; while the switch input originating at the second waveguide 20 is here directed by the spatial switch to a second output waveguide 22 and second output 29.

In a second controllable switch state, the switch spatially reverses the two outputs; here, the dropped channel is directed to the second output waveguide 22 and second output 29, while the switch input originating at the second input waveguide 20 is directed via the branching waveguide 24 to the second filter 26 for injection with the copropagating channels and output at the first output 31.

Turning to FIG. 3, in an example microfabricated embodiment of this class of wavelength-specific add/drop switches, shown in a planar top view, the switch components are formed as monolithic structures on a substrate 21. The first input waveguide 12 of the switch here is fabricated on the substrate to confine the input channels via total internal reflection, and is configured as an integral component of the first filter 14, here embodied as a microfabricated resonant channel-dropping filter 32 employing a resonant optical reflector Bragg grating 33 and a resonant optical receiver Bragg grating 35. The channel-dropping filter (CDF) 32, described in detail below, directs the dropped channel from the first input waveguide 12, also referred to hereinafter as the center waveguide between the two resonators, to the branching waveguide 16 for input to the spatial switch 18. Here, the spatial switch 18 is embodied as a microfabricated interferometric switch 34 including two 50/50 evanescent coupling regions 37, 38, separated by two interferometer arms 40, 42, one or both of which include a phase controller 44, 46, for controlling the relative phase difference between optical modes that propagate along the interferometer arms. The first coupling region 37 splits the optical energy from the two waveguides, 16, 20, onto the two interferometer waveguides 40, 42.

It is the interferometer phase controllers 44, 46, that set the state of the spatial switch output configuration. Based on the state of the phase controllers, the second coupling region 38 splits the optical energy from the two interferometer waveguides 40, 42, between the second output waveguide 22 and the second filter 26, here embodied as a microfabricated channel-adding filter (CAF) 36. The CAF configuration is the reverse of that of the CDF, here including a resonant optical transmitter Bragg grating 41 and a resonant optical reflector Bragg grating 43. The CAF adds a channel from the branching waveguide 24 to those channels copropagating in the first output waveguide 30, also referred to hereinafter as the center waveguide between the two gratings.

The operation of the add/drop switch is more fully described with reference to FIGS. 4A and 4B. In the first state described above for the spatial switch 34, hereinafter referred to as the line state, shown in FIG. 4A, the phase controllers 44, 46, of the interferometer arms 40, 42, are set such that the phase difference, $\Delta\phi$, between optical modes propagating along the two arms is $(2n\pi+\pi)$, wherein n is any integer, including zero. The Bragg gratings of the CDF and CAF are fabricated such that the Bragg period characteristic of the gratings corresponds to the center frequency of the channel of interest.

In operation, the CDF 32 drops from the first input waveguide 12 the channel of interest, e.g., a channel of $\lambda_2$ wavelength, out of N distinct channels input on the first input waveguide. The $\lambda_2$ channel is directed to the interferometric switch 34, while the other channels, i.e., the $\lambda_1$, $\lambda_3, \ldots, \lambda_N$ channels, copropagate along the next waveguide section 15. Along the second input waveguide 20 can be introduced a $\lambda_2'$ channel, here identified with nomenclature to indicate that it may be of differing data from the dropped $\lambda_2$ channel but that, as explained earlier, it is preferably of a wavelength band center frequency identical to that of the dropped channel.

In this line state of the switch, the optical energy of the dropped $\lambda_2$ channel and the input $\lambda_2'$ are split by the input coupling region 37 to propagate channel propagate along arms 40, 42. The interferometric switch imparts a difference in phase of $\pi$ between the two arms 40, 42. After combination through the second coupling region 38, this results in the $\lambda_2$ dropped channel being directed to the CAF 36 to rejoin the copropagating channels, albeit with a time delay. The input $\lambda_2'$ channel here is directed to the second output waveguide 22.

Figure 4B:
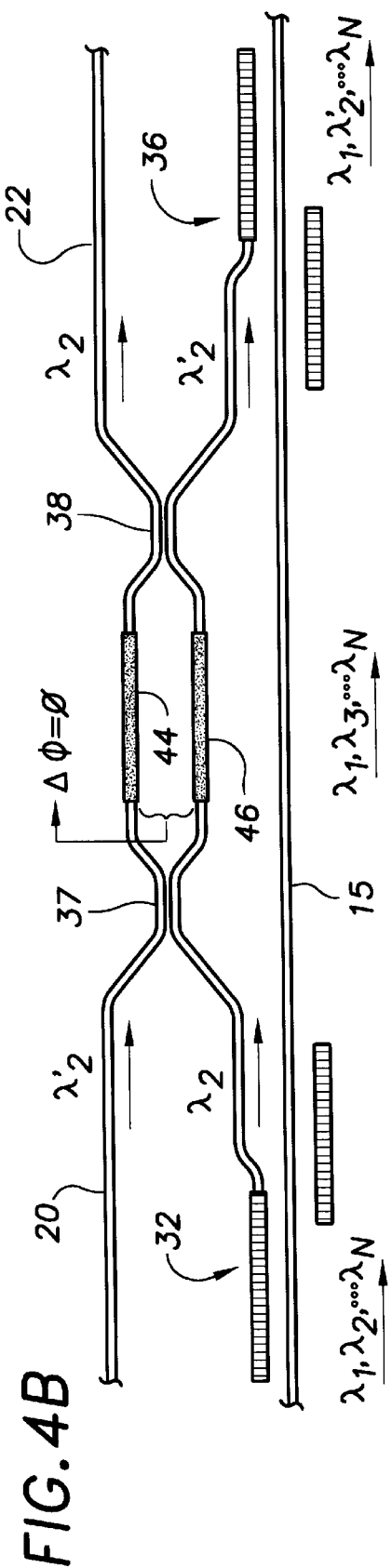
FIG. 4B is a schematic diagram of the switch implementation of FIG. 3 in a second control state.

In the cross state of the add/drop switch, shown in FIG. 4B, the phase controllers 44, 46, of the interferometer arms are set such that the phase difference, $\Delta\phi$, between optical modes propagating along the arms is ($2n\pi$), where n is any integer, including zero. In this second state, as in the first, a selected channel, e.g., the $\lambda_2$ channel, is dropped by the CDF 32 while the remaining $\lambda_1, \lambda_3, \ldots, \lambda_N$ channels copropagate undisturbed along the waveguide 15. With the spatial switch set in this second state, a $\lambda_2'$ channel that is introduced at the second input waveguide 20 is switched with the dropped $\lambda_2$ channel at the output of the spatial switch 34, with the $\lambda_2'$ channel being directed to the CAF 36 for adding with the copropagating channels and the dropped $\lambda_2$ channel being directed to the second output waveguide 22.

This controllable, dual-state switch operation provided by the invention enables the wavelength-specific user channel configuration of the optical ring LAN described earlier and shown in FIG. I to be facilitated in a particularly elegant manner; in the line state, the switch is substantially transparent to all channels of the LAN, and only in the cross state is the user channel of interest tapped from the LAN, remaining transparent to the other channels. This efficient user node channel control eliminates the need for continuous spatial separation of every channel on the LAN at every user node. Other advantages of the switch will be discussed below.

Turning now to specific design and fabrication considerations for the add/drop switch of the invention, first the design of the CDF and CAF will be discussed. The cross-sectional design of these components should preferably include considerations for waveguide-grating evanescent coupling strength, Bragg grating strength, waveguide-grating phase-velocity synchronism, and single-mode transmission characteristics; the planar design should preferably include considerations for obtaining desired channel linewidth transmission, as well as reception, and crosstalk behavior, and insertion and propagation losses. In addition, the design preferably accounts for fabrication error tolerance.

Figure 5A:
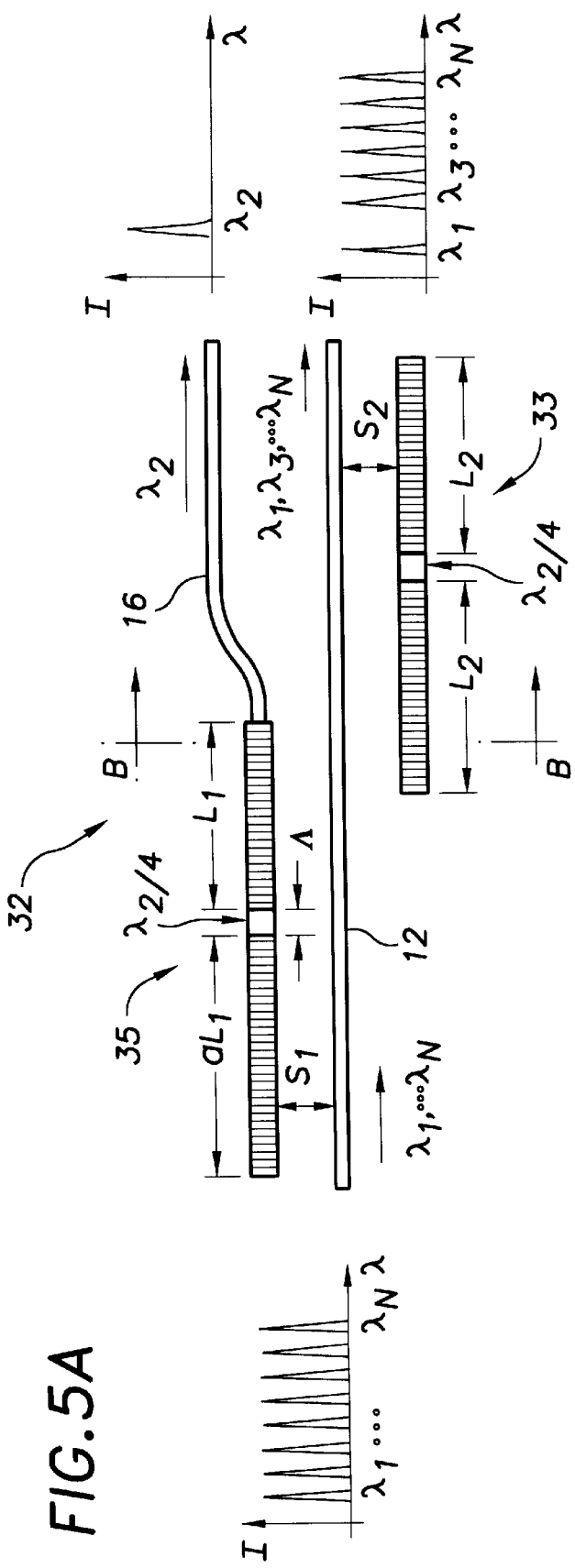
FIG. 5A is a top-down schematic diagram of a channel-dropping filter employed in the switch implementation of FIG. 3.

FIG. 5A identifies the relevant geometric parameters for the channel-dropping filter 32. First reviewing the CDF operational details, the CDF enables single-channel filtering using two side-coupled quarter-wave shifted Bragg resonators that act in concert to remove from the input waveguide 12 that channel for which the resonators were designed to evanescently couple from the input waveguide 12. The Bragg resonators are provided as a reflector Bragg grating 33 and a receiver Bragg grating 35, each formed as a waveguide that is provided with a grating structure having an identical grating period, that period being one which corresponds to the Bragg wavelength, set as the center frequency of an optical channel to be dropped from the input waveguide 12, e.g., the $\lambda_2$ channel, as shown in the figure. The Bragg gratings act to vary the effective refractive index of the grating waveguides in a periodic fashion, resulting in a grating resonator functionality with the ability to evanescently couple optical energy to and from the adjacent input waveguide 12; only the energy of a frequency band that is centered at the Bragg wavelength and whose width is equal to the width of the grating resonance can be coupled.

A spacer portion, hereinafter referred to as a quarter-wave shift (QWS), that corresponds to the Bragg wavelength for the dropped channel, i.e., at $\lambda_2/4$ in this example, located at a point along each of the gratings, supports a single high-efficiency coupling response at the Bragg wavelength; the wave shift imposes a net one-quarter wavelength shift of the Bragg wavelength along the grating. The location of the quarter-wave shift distinguishes the operation of the reflector and receiver Bragg gratings. A wave shift centered along the length of a grating results in balanced resonator functionality and enables reflection of a selected channel back toward the input of the input waveguide. An off-center location of the quarter-wave shift results in an unbalanced resonator functionality, whereby significant optical energy can escape from the short "arm" of the grating. Location of a "tap-off" waveguide, at the end of this short arm enables capture and guiding of the escaped light.

With this configuration, the reflector and receiver Bragg gratings 33, 35, can cooperate to drop a selected channel, e.g., the $\lambda_2$ channel, from the input waveguide 12 and capture it with the branching waveguide 16, if the two gratings are located in proximity to the input waveguide 12 with a net quarter-wave shift separation, as seen along the center waveguide, between the gratings at the Bragg wavelength. In the example design for dropping the $\lambda_2$ channel, the reflector Bragg grating 33 resonates in response to the $\lambda_2$ channel and evanescently couples to the input waveguide 12 to reflect the $\lambda_2$ channel back to the waveguide input (to the left), while allowing the other channels to transmit (to the right) along the waveguide 12 undisturbed. Simultaneously, the receiver Bragg grating resonates in response to the $\lambda_2$ channel and due to its unbalanced arm lengths, allows the $\lambda_2$ channel to escape from the end of its short arm, $L_1$, where the $\lambda_2$ channel is captured by a branching waveguide 16. With this cooperating action, the two gratings act to drop the $\lambda_2$ channel from the input waveguide 12 but transmit it on the branching waveguide 16.

Considering the complementary operations of the CAF, in an example channel-adding configuration for the $\lambda_2$ channel, the CAF transmitter Bragg grating 41, FIG. 3, transmits the $\lambda_2$ channel to the first output waveguide 30, with the CAF reflector Bragg grating 43 cooperating to enforce this transmission action. It is to be recognized that the considerations discussed below for the CDF design are equally applicable to the CAF design.

The following parameters are to be selected for tuning the CDF operation for selected channel dropping. As shown in the figure, the Bragg grating period, $\Lambda$, of the gratings 33, 35, is selected to correspond to the channel wavelength of interest. In the receiver grating 35, the length of each resonator "arm," i.e., the length of the grating on each side of the location of the quarter-wave shift (QWS), is selected with the short arm, $L_1$, being that arm on the side to which the dropped channel is to be transmitted (to the right in the figure); the long arm is then scaled as a function of the short arm, i.e., $aL_1$, where a is greater than one. The arms of the reflector grating 33 are equal, each set as $L_2$. The optical path length of the input waveguide 12 between the QWS of the receiver and reflector gratings is set to be an integral number of one-half Bragg wavelengths plus one quarter Bragg wavelength. The receiver grating 35 is separated a first specified distance, $S_1$, from the input waveguide 12, and the reflector grating 33 is separated a second specified distance, $s_2$, from the input waveguide 12.

Figure 5B:
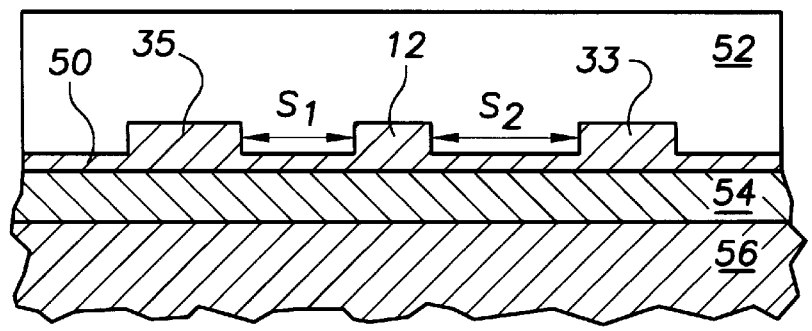
FIG. 5B is a cross sectional view of the channel-dropping filter of FIG. 5A taken at B—B'.

FIG. 5B provides a cross-sectional view of one example implementation of the CDF of FIG. 5A, taken at B—B'. The input waveguide 12 and reflector and receiver gratings 33, 35, respectively, all are in this example implementation formed of a common core layer 50 in which optical transmitted energy is vertically confined due to an upper confinement cladding layer 52 and a lower confinement cladding layer 54. This confinement can be accomplished by, e.g., employing cladding materials having a lower refractive index than the core material, as is conventional. The cladding and core layer "sandwich" thus formed is supported on an underlying substrate 56.

Optical transmitted energy is horizontally confined to the waveguide and grating regions of the core layer by rib-shaped steps that define each of the grating waveguides 33, 35, and the other waveguides, e.g., the first input waveguide 12, in the core layer. The periodic grating structure etched into the grating ribs, shown in FIG. 5A, acts to spatially vary the effective index of refraction along the gratings, as explained earlier. It is to be recognized that such gratings can be formed directly on the core layer or alternatively on the top of the upper cladding layer 52, aligned to the corresponding underlying ribs in the core layer. Alternatively, the periodic grating can be produced by an optically-induced refractive index variation such as a photo-refractive variation produced by irradiation by UV radiation of a hydrogen-loaded, germanium-doped, silicon dioxide core layer.

Table I below summarizes the physical parameters of the CDF illustrated in FIGS. 5A–B, along with optical, spectral, and additional parameters for designing the CDF. Physical parameters that are specific to the cross-sectional waveguide geometries will be presented later in the discussion

TABLE I

| Optical Parameters | Definition |
|---|---|
| κ | Grating strength (cm$^{-1}$) |
| μ | Waveguide-waveguide coupling strength (cm$^{-1}$) |
| n$_{eff}$ | Waveguide effective index |
| n$_g$ | Waveguide group index |

| Physical Parameters | Definition |
|---|---|
| L$_1$ | Resonator arm length from QWS (short) |
| α | Scaling between arm lengths (L$_2$ = αL$_1$) |
| L$_2$ | Resonator arm length from QWS (long) |
| Λ | Grating period |
| s$_{1,2}$ | Waveguide-waveguide separation |

| Spectral Parameters | Definition |
|---|---|
| λ$_B$ | Wavelength of resonance peak |
| I$_s$, I$_t$, I$_r$ | Peak resonance intensities, signal, transmission, reflection |
| Δ$_v$ | Resonance linewidth |
| BL$_{in}$ | In-band baseline level |
| BL$_{out}$ | Out-of-band baseline level |

| Additional Parameters | Definition |
|---|---|
| p | Ratio of power escape mechanisms, and R = pZ$_o$ |

Of the physical parameters given above, the grating period, ζ, is set based on the selected Bragg wavelength, λ$_B$, corresponding to a selected channel to be dropped by the CDF. The Bragg wavelength, λ$_B$, is defined as:

$$\Lambda = \frac{\lambda_B}{2n_{eff}}; \quad (1)$$

and where ζ is the period of the grating and n$_{eff}$ is the effective refractive index of the optical mode.

Turning to the other geometric parameters, consideration of the Q-parameter of the Bragg gratings must be made. Any resonator which is coupled to external sources is described by a Q-parameter. The Q-parameter of a resonator is in general given as the ratio between the total energy contained within the resonator divided by the net power which escapes the resonator per resonant cycle. In the case of the side-coupled resonators of the add/drop filter, there are two primary energy-escape mechanisms: energy which escapes from the two ends of the finite-length grating resonator, and energy which escapes from the resonator by evanescent side-coupling to the input waveguide. The inverse Q-parameter associated with energy escape from one resonator end is given by:

$$\frac{1}{Q_l} = \frac{2\kappa v_g}{\omega_0} e^{-2\kappa L}; \quad (2)$$

while the inverse Q-parameter associated with energy escape to the center waveguide in both directions is given by:

$$\frac{1}{Q_e} = \frac{4\kappa v_g}{\omega_0}(\mu/\kappa)^2; \quad (3)$$

where in both equations, ω$_0$ is the Bragg frequency, v$_g$ is the group velocity of the optical mode, κ is the grating strength, μ is the evanescent coupling strength, and L is the length of the waveguide between the quarter-wave shift to the grating end. The grating strength will be determined by the waveguide design as given by the following.

The total inverse 0-parameter of a resonator then given as the sum of the constituent inverse Q components:

$$\frac{1}{Q_{tot}} = \frac{\Delta v}{v_0} = \frac{1}{Q_e} + \frac{1}{Q_l}; \quad (4)$$

where Δv is the FWHM of the Lorentzian-like resonance and v$_0$ is the center frequency. A useful variable change to convert between v$_g$/ω$_0$ to more directly available design quantities is v$_g$/ω$_0$=λ$_B$/2πn$_g$.

Next, the balance between the two inverse-Q components is defined using the p parameter as:

$$\frac{1}{Q_e} = \frac{p}{2}\frac{1}{Q_l}. \quad (5)$$

It can be shown that the power, transferred to the receiver port of the receiver grating, I$_s$, the power transmitted along the input waveguide, I$_t$, and the power reflected along the input waveguide, I$_r$, are given by the following relations, respectively:

$$I_s = \frac{4p}{(p+2)^2} \quad (6)$$

$$I_t = \frac{4}{(p+2)^2}$$

$$I_r = \frac{p^2}{(p+2)^2}$$

The balance between the two energy escape mechanisms determines the degree of transmission, reflection, and reception, while the sum of the energy escape mechanisms dictates the spectral linewidth of the resonance.

Considering first the design for the receiver resonator, by design, in order for a resonant channel-drop filter to tap off 100% of the on-resonant light from the center waveguide, the receiver resonator, as it stands alone, must transmit, receive, and reflect 4/9, 4/9, and 1/9, respectively, of the incident optical power on the center waveguide. Referring to the above equations, the p parameter must equal unity to achieve the proper energy escapement balance. As such, the total inverse Q parameter for the receiver resonator is three times the inverse Q parameter associated with the energy which escapes the resonator via evanescent side coupling. Using the above equations, the $\mu/\kappa$ ratio for the receiver resonator is then given as:

$$\mu_1/\kappa = \left(\frac{\pi n_g \Delta v}{6\kappa c}\right)^{1/2}; \quad (7)$$

where c is the speed of light in vacuum. This relation gives the strength of the evanescent side-coupling required for a fixed resonance linewidth, grating strength, and group index of the optical mode. The actual physical separation between the receiver resonator center waveguide, given as $s_1$ in FIGS. 5A–B, is approximately determined in general as:

$$\mu(s) = \mu_0 e^{-\alpha s}; \quad (8)$$

where $\mu_0$ and $\alpha$ are determined once the particular waveguide geometries are fixed.

The length $L_1$ between the quarter-wave shift and the short end of the receiver resonator is found from the balance between the two aforementioned energy escape mechanisms. Using Eqns. (2–3) in combination with Eqn. (4), and assuming insignificant energy loss from the long end of the grating, the $\kappa L$ product for the short grating end is given as:

$$\kappa L_1 \cong \ln\left[\frac{1}{2}(\kappa/\mu_1)\right]. \quad (9)$$

The length of the long arm is then set to be long enough so that only a small amount of light escapes from this end. For example, the long grating arm can be twice as long as the short grating arm.

Considering next the reflector resonator, by design, the reflector resonator is to reflect most of the incident light back along the center waveguide. For example, 99% or more of the light is optimally reflected. In this case, the p value for the reflector would be p≅397. In general, transmission past the reflector resonator is preferably as low as possible so as to completely extinguish the on-resonator energy of the selected channel from the center waveguide. Nearly complete extinction is preferred in order to avoid interference with other data streams which share the same center wavelength.

By design, then, the reflector resonator is to return to the center waveguide nearly all of the optical energy of the selected channel wavelength band which comes along the waveguide. The only energy escape mechanism from the reflector resonator is coupling back to the center waveguide; recall that the two arms of the reflector resonator are of equal length, and here, by design, the arms are made long enough so that any energy leakage from the ends is insignificant. Also by design, the Q-parameter of the reflector should match that of the receiver; a difference in the two Q parameters would create spurious transmission or reflection along the center waveguide for wavelengths slightly off from the Bragg frequency. While these spurious transmissions or reflections can have some practical use in a particular application, in the general design provided here they are avoided.

To match the Q-parameters between the reflector and receiver resonators, the coupling strength between the reflector waveguide and the center waveguide must be greater than the receiver-to-center waveguide coupling strength. The receiver resonator, as designed above, loses a total of three times the energy which couples to the center waveguide every resonant cycle. The energy loss to the center waveguide must be increased for the reflector resonator to correspondingly decrease its Q value to match that of the receiver resonator. The result is that, approximately, the ratio of reflector to receiver coupling strengths is given as:

$$\mu_2 \cong \sqrt{3}\,\mu_1. \quad (10)$$

The $\kappa L$ product for the reflector arms centered at the quarter wave shift is then given by:

$$\kappa L_2 \cong \ln\left[\sqrt{\frac{p_2}{6}}\,(\kappa/\mu_1)\right]. \quad (11)$$

While this discussion of the design of the two side-coupled resonators has presented the necessary design equations, there are practical limits to the range of values of grating strength and waveguide-waveguide coupling strength, which in turn limit the range of resonant linewidths and degree of crosstalk between the center waveguide and grating waveguides. Specifically, when the gratings are formed as physical corrugation patterns in corresponding waveguides, the grating strength is a function of the depth of the grating pattern and the core-to-clad refractive index difference. A deep grating and high core-to-clad index difference is necessary for a large grating strength, which in turn can yield a wide resonant linewidth. However, such a grating will likely be highly polarization-dependent, have a high aspect ratio, as defined as the grating height divided by half the grating period, have a small mode size, and exhibit large radiation loss due to coupling the grating induces between the bound and radiation modes of the structure. Thus, moderation in the grating strength is necessary.

Similarly, moderation is necessary for the waveguide-waveguide coupling strength. If the coupling strength required by the equations above is excessively large, where, for example, the transverse-direction evanescent field decay between waveguides is only a few e-folds down, then higher order coupling effects become important. These effects loose the distinction in which one bound mode is associated with only one waveguide. Such a loss of distinction creates inherent crosstalk between the two waveguides, which in turn produces a deleterious effect in the overall filter response.

Finally, as one tries to decrease the resonance linewidth, inherent waveguide loss becomes a significant effect. Waveguide loss introduces a third energy escape mechanism to the resonator. If the energy which escapes the resonator from the grating ends or via coupling to center waveguide is less than the energy which is lost per cycle due to loss, then the Q-parameter of the resonator is dominated by the loss. Such dominance of the loss at narrow resonant linewidths creates a practical lower bound on the linewidth these resonant add/drop filters can achieve.

In a preferred embodiment of the CDF and CAF designs, the coupling strength between the center waveguide and each of the CDF and CAF gratings is tapered at the location of each of the CDF and CAF resonator gratings to provide a distance of closest proximity at the location of the QWS of each resonator. The purpose of the taper is to reduce the optical power which is exchanged between each of the resonator waveguides and the center waveguides for input optical frequencies outside the selected channel, i.e., outside of the Bragg stopband. Such a taper is preferably designed so that at the selected Bragg frequency, the Q-parameter of each resonator is the same as the case where the center waveguide-resonator waveguide pair has no taper accounted for in the coupling parameter.

Figure 6:
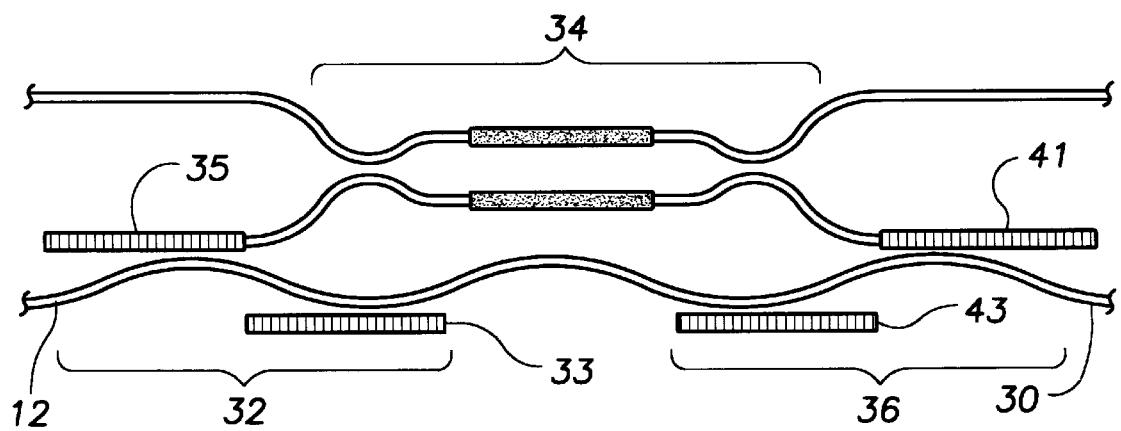
FIG. 6 is a schematic diagram of the example switch implementation of FIG. 3 adapted with a tapered waveguide configuration.

Referring to FIG. 6, there are several taper configurations that can be employed. In a first example taper configuration, shown in the figure, the center waveguide can take the shape of an arc in the areas of the resonators. In this case, the input waveguide section 12 first arcs toward the receiver resonator 35 of the CDF 32, then arcs toward the reflector resonator 33 of the CDF; in the area of the CAF 36 the output waveguide section arcs toward the reflector resonator 43 and then arcs toward the transmitter resonator 41. The closest approach between the center waveguide and each resonator is located at the quarter-wave shift of the resonator.

In an alternative configuration, the center waveguide can take the shape of a 'V' where an approaching segment and withdrawing segment, toward and away from, a resonator are both straight waveguide sections but each is at an angle with respect to the resonator; at the quarter-wave shift the waveguide abruptly changes angle from approach to withdrawal. Alternatively, the center waveguide can take a shape similar to a 'V' shape but with the addition of a waveguide section parallel to each resonator between the two angled sections. Other center waveguide layout configurations can be employed, as can be recognized based on this discussion.

Considering specific design parameters for an arcing waveguide design as shown in FIG. 6, the two geometric parameters to be determined are the radius of curvature, R, and the decrease in separation between the center waveguide and resonator waveguides.

Recall that the Q-parameter related to energy escape from a resonator to the center waveguide is given as:

$$\frac{1}{Q_e} = \frac{4\kappa v_g}{\omega_0} (\mu_0^{(l)}/\kappa)^2; \quad (12)$$

where the coupling strength is here written as $\mu_0^{(l)}$ to indicate that $\mu$ is constant across the resonator length and that the waveguide shape is linear, (l).

A new Q-parameter that is associated with the tapered-coupling center waveguide can be calculated and then equated to the above Q expression. Using a model where the center waveguide shape is characterized as having a parabolic shape in the area of a given resonator's quarter-wave shift and where the maximum angle of the parabolic arc is less than 15°, the separation between center waveguide and resonator waveguides, y, as a function of length, z, is approximately given as $y(z)=z^2/2R$. Application of the parabolic shape to the coupling equations then yields a new Q-parameter associated with the arc-waveguide as:

$$\frac{1}{Q_e} = \frac{4\kappa v_g}{\omega_0} (\mu_0^{(c)}/\kappa_{eff})^2; \quad (13)$$

where $\mu_0^{(c)}$ is the maximum coupling strength of the circular waveguide, (c), shape, and $\kappa_{eff}$ is the effective resonator field growth/decay as experienced on the center waveguide. The effective $\kappa$ is given as:

$$\kappa_{eff} = \left[ \sqrt{\frac{\pi}{2}} R_v e^{R_\kappa^2/2\alpha} \left[ 1 - erf\left( \frac{R_S}{\sqrt{2} R_v} \right) \right] \right]^{-1}; \quad (14)$$

where $$R_v = R\kappa/\alpha$$
$$R_S = \sqrt{R/\alpha};$$

and where $\alpha$ is the transverse decay rate of the bound optical mode.

In order to maintain the total Q-value of the resonator, Eqns. (12) and (13) are equated to each other. The result is the identity given as:

$$\mu_0^{(l)}/\kappa = \mu_0^{(c)}/\kappa_{eff}. \quad (15)$$

Because $\kappa_{eff} \geq \kappa$, then $\mu_0^{(c)} \geq \mu_0^{(l)}$; in other words, the closest approach of the center waveguide to the resonator guide must be closer than in the case of a straight center waveguide shape. The decrease in separation between the center and resonator guides is given as:

$$\frac{\mu_0^{(c)}}{\mu_0^{(l)}} = e^{\alpha \Delta y};$$

so that $$\Delta y = \frac{1}{\alpha} \ln\left[ \frac{\kappa_{eff}}{\kappa} \right]. \quad (16)$$

The remaining geometric parameter to be selected is the radius of the arc, R. There are a variety of selection criteria that can be used, depending on the application to be considered for this parameter. One example criteria is simply that at z=L, the end of the resonator, the sweep of the arc is some fixed angle, say 15 degrees. In this case, the arc radius is given as:

$$R = L/\sin\theta. \quad (17)$$

A second criteria is one based on the degree of evanescent power coupling between the center waveguide and the resonator waveguides for light whose wavelength is outside of the selected Bragg stopband. The power that is exchanged is related to first order by the phase integral of the coupling parameter as:

$$\phi = \int_{-L}^{L} \mu(z) dz. \quad (18)$$

The actual crosstalk from the center waveguide to a given resonator is given as:

$$BL_{Out}^{(S)} = \sin^2(\phi). \quad (19)$$

A convenient normalized notation is introduced here, where $R=\alpha L^2/2d$, where L is the resonator length from the quarter-wave shift to the end, and where d is defined as $\alpha y(z=L)=d$, which is the number of e-folds the transverse center waveguide field has decayed at the end of the resonator. The integrated phase for the arc-shaped tapered-waveguide is given as:

$$\phi_c = (2\mu_o^{(l)}/\kappa)f(\kappa L; d);\qquad(20)$$

where $$f = \frac{e^{-(\kappa L)^2/4d}}{1 - \mathrm{erf}\left(\frac{\kappa L}{2\sqrt{d}}\right)}\mathrm{erf}(\sqrt{d});\qquad(21)$$

and $1 < f \leq \kappa L$.

In practice, a realistic f-value can be in the range of between about 1.25–1.35. Given some desired decrease in the power coupled between the center waveguide and resonator waveguides, an f-value can be found which in turn yields a radius for the arc. The bend-loss associated with any radius of curvature, R, should preferably not be large enough to interfere with various other design criteria, such as total insertion loss.

The expression for $\phi_c$ in Eqn. (20) indicates that there is an inherent lower-bound on the out-of-band crosstalk, given a specific filter linewidth. Out-of-band crosstalk reduction below that in Eqn. (20), even with f=1, can be realized only via pre- or post-filtering spectral components which lie outside of the stopband.

A further design criterion for the center waveguide taper is based on the fact that, as explained above, the reflector and receiver resonators of the CDF, like the reflector and transmitter resonators of the CAF, must be separated length-wise by one quarter of the selected Bragg wavelength, as accrued along the center waveguide. The arc introduced into the center waveguide shape in the taper design presented above requires a correction to the design radius value to produce this net quarter-wave shift. Given that the two resonators of, e.g., the CDF, are themselves preferably produced on a globally coherent grid system, meaning the that the grating "teeth" periodicity does not fall out-of-step from one resonator to the next along the longitudinal axis, then the center waveguide arc radius and sweep angle must satisfy an equality given as:

$$\frac{2}{3}(R/\lambda)\theta^3 = n;\qquad(22)$$

where n is any integer and λ is the selected Bragg wavelength. This relationship expressed in relation (22) was not specifically enforced by the taper design criteria given previously. This relationship adds a small correction to the radius R, or equivalently the sweep angle θ, to meet the quarter-wave shift requirement of the resonators.

For clarity, the radius R from the preceding analysis will now be referred to as $R_0$. The adjusted value of the radius is then given as $R_1$, where $R_1 = R_0 + \Delta R$, the amount of radius adjustment. Relating these parameters as:

$$\frac{2}{3}(R_0/\lambda)\theta^3 = n + \varepsilon\qquad(23)$$

$$\frac{2}{3}(R_1/\lambda)\theta^3 = n;$$

where ε is the remainder from the non-integral value on the left-hand side of Eqn. (23), a radius that achieves a quarter-wave shift between the two resonators along the center waveguide is then given as:

$$R_1 = R_0 - \frac{3}{2}(\lambda/\theta^3)\varepsilon.\qquad(24)$$

With this formulation, an accuracy of the radius specification to about 1 μm is sufficient to achieve an accuracy of about 0.05% in the net quarter-wave shift.

Figure 7A:
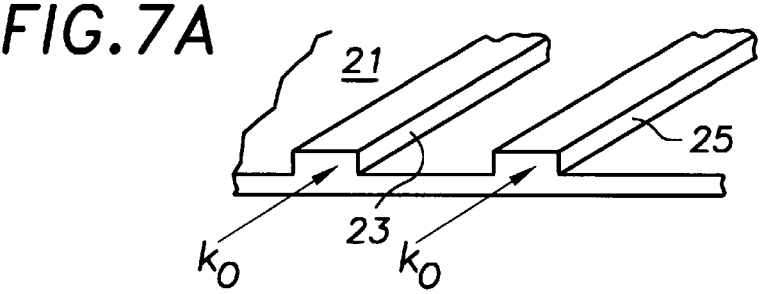
FIG. 7A is a schematic perspective view of two side-by-side waveguides having the same propagation constant.
Figure 7B:
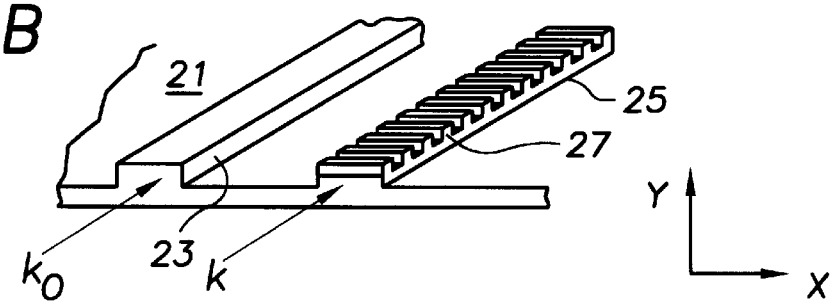
FIG. 7B is a schematic perspective view of the waveguides of FIG. 7A with the second waveguide here including a Bragg grating.

Both the straight- and tapered-center waveguide designs just discussed are based on an assumption that the phase velocities of the center waveguide and each of the resonator waveguides are matched. However, without specific waveguide design criteria that impose a phase-velocity matching requirement, this requirement is not necessarily automatically met. The condition to be compensated for is illustrated in FIG. 7. Referring to FIG. 7A, there is shown a core layer 21 on which two waveguide ribs 23, 25, have been produced with substantially identical dimensions. In this scenario, the two waveguide ribs 23, 25, are both characterized by the same propagation constant, $k_0$. Turning to FIG. 7B, if the second waveguide rib 25 is modified to include a periodic grating 27, then the propagation constant of the modified rib is correspondingly shifted to a new propagation constant value, k, that is different from the propagation constant $k_0$, of the first waveguide rib 23.

The origin of this shift in propagation constant, and correspondingly, the phase velocity, of a grating waveguide, can be understood as follows. When a waveguide mode at a selected Bragg wavelength is coupled to a corresponding Bragg resonator grating, the mode is reflected to some extent back along the grating waveguide, as explained earlier. Using perturbation theory, the grating strength of a first-order square-wave grating is given by $$\kappa = \frac{\Delta\varepsilon}{\lambda_o n_g}\Gamma_x\Gamma_y\sin(\pi D);\qquad(25)$$

where κ is the grating strength, $\lambda_o$, is the Bragg wavelength, $n_g$ is the group index of the bound mode, D is the grating duty cycle, and $\Gamma_x$ and $\Gamma_y$ are the overlaps of the transverse field profile with the grating lateral and vertical cross section, respectively. In general, $\Gamma_x$ and $\Gamma_y$ can be combined into one overlap factor, depending on the geometry of a given waveguide.

The reflection strength of the grating is that grating characteristic which impacts the phase velocity supported by the grating. Specifically, the introduction of the grating to a rib waveguide necessarily changes, and in this case reduces, the effective modal index of the grating waveguide because some fraction of the core region is now modulated with a lower-index cladding region that is deposited on top of the grating and thus that fills the space between each grating tooth. The change in propagation constant, k, for a slab mode due to the presence of a grating is found from perturbation theory to be given as:

$$k_0^2 - k^2 = \left(\frac{2\pi}{\lambda_0}\right)^2(1-D)\Delta\varepsilon\Gamma_y;\qquad(26)$$

where Δε is the difference in material dielectric constants between the core layer and a cladding layer on top of the core layer, and $\Gamma_y$ is the same overlap integral that appears in the grating strength expression.

The difference in refractive index, and corresponding differences in propagation constant and phase velocity between a waveguide with no grating and one having a grating are generally compensated for by varying the shape of the waveguides. The following analysis for enabling such variation assumes the geometric configuration of FIG. 7B, namely, that a core layer is provided that is patterned with the waveguide ribs, with a grating patterned directly on top of the waveguide rib. After the intended etching, an upper cladding layer is then deposited on the core layer.

To maintain clarity and distinction between the many waveguide parameters involved in this analysis, in the following discussion the notation for the refractive index is almost exclusively replaced by the dielectric constant, in order to remove unnecessarily cumbersome squared quantities from the equations. The symbols $\epsilon$, e, and $\zeta$, are intended to represent the material dielectric constant, the effective slab dielectric constant as used in the effective-index method, and the full effective modal dielectric constant, respectively. All dielectric constants are relative to the permittivity of free-space. The subscripts to these three symbols indicate the associated waveguide, e.g., $e_g$ refers to the effective dielectric constant of the slab mode under the grating rib waveguide. Dual subscripts refer to differences between quantities, e.g., $\Delta e_{uc}$ refers to the $e_u$-$e_c$. Where refractive indices are used, n represents a material index, $n_g$ represents the group refractive index of the full mode, and $\eta$ is the effective index of the full mode.

Secondly, in order to distinguish between normalized slab waveguide parameters for the vertical and lateral directions, the normalizing variables b and V, as first adopted by Kogelnik and Ramaswamy, are used exclusively for the lateral direction and the symbols g and W exclusively used for the vertical direction. Nonetheless, g and W have the same functional forms as b and V, respectively.

Figure 8A:
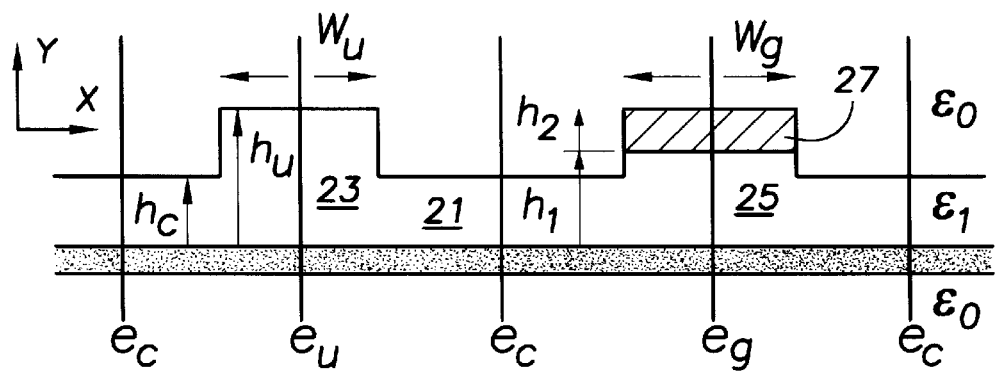
FIG. 8A is a schematic cross-sectional representation of the dimensions and stack refractive indices of the waveguides of FIG. 7B.
Figure 8B:
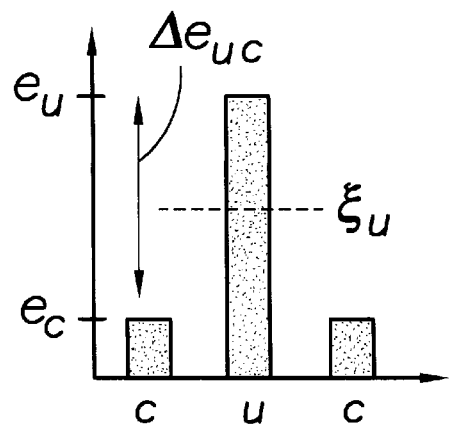
FIGS. 8B–8C are two plots of stack refractive indices for the six stack locations identified in FIG. 8A.
Figure 8C:
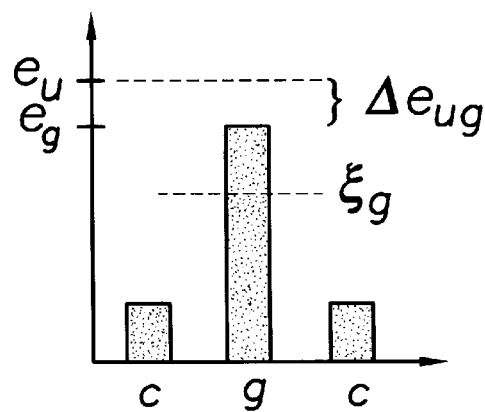

FIG. 8A shows a cross-section of the resonator grating-center waveguide pair of FIG. 7B and the relevant optical and physical parameters for their design. The widths of the two waveguides 23, 25, are not necessarily equal, with the width of the straight waveguide rib 23, i.e., the waveguide rib that is unetched with a grating, given as $w_u$ and the width of the waveguide rib 25 etched with a grating 27 given as $w_g$. The total height of the unetched waveguide rib 23 is given as $h_u$ and the height of the grating waveguide rib 25 is given as $h_1+h_2$, i.e., the sum of the heights of the rib and the grating, respectively.

FIG. 7B is a bar chart of the effective stack indices under the unetched waveguide rib 23, and to either side of the rib; and FIG. 7c is a bar chart of the effective stack indices under the etched waveguide rib 25, and to either side of the rib. The effective stack indices of the unetched waveguide, the grating waveguide, and the adjacent etched cladding regions, are $e_u$, $e_g$, and $e_c$, respectively. The presence of the grating on the left waveguide reduces the effective stack index by the amount $\Delta e_{ug}$, or using Eqn. (26):

$$\Delta e_{ug} = (1-D)\Delta\epsilon\Gamma_y. \tag{27}$$

That is, the effective stack indices of the center waveguide and grating guides are related by $e_g = e_u - \Delta e_{ug}$.

With the definition of the lateral normalized modal dielectric constant (or lateral dielectric factor for short) b given as:

$$b = \frac{\zeta - e_c}{e - e_c}; \tag{28}$$

where $\zeta$ is the effective modal dielectric constant, then the modal dielectric constants of the unetched and grating guides, $\zeta_u$ and $\zeta_g$, respectively, are given as:

$$\zeta_u = b_u \Delta e_{uc} + e_c; \tag{29}$$

$$\zeta_g = b_g(\Delta e_{uc} - \Delta e_{ug}) + e_c. \tag{30}$$

To insure phase-velocity matching between the two waveguides, the effective modal dielectric constants must be equal: $\zeta_u = \zeta_g$. This condition generates a relation between the unetched waveguide and grating lateral dielectric factors that must be satisfied:

$$b_u = \frac{\Delta e_{uc} - \Delta e_{ug}}{\Delta e_{uc}} b_g. \tag{31}$$

Clearly, $\Delta e_{ug}$ must always be less than or equal to $\Delta e_{uc}$ to have two guiding waveguides.

In order to expand the analysis from Eqn. (31) to one where the widths of the two waveguides can be determined, the universal transverse-electric (TE) three-layer slab waveguide equations are employed. In the usual notation, the eigenvalue equation for the first symmetric bound mode is given as:

$$V = \frac{2}{\sqrt{1-b}}\tan^{-1}\sqrt{\frac{b}{1-b}}; \tag{32}$$

where b is defined as before and V is defined as $$V \equiv 2\pi(w/\lambda_0)\sqrt{e - e_c}; \tag{33}$$

where e is the effective dielectric constant of the center stack. For maximal lateral confinement without striking a second lateral mode, $V=\pi$ and $b \approx 0.6464$. Equation (33) is next rewritten for the normalized grating and center waveguide widths:

$$w_g/\lambda_0 = \frac{V_g/\pi}{2\sqrt{\Delta e_{uc} - \Delta e_{ug}}}; \tag{34}$$

and $$w_u/\lambda_0 = \frac{V_u/\pi}{2\sqrt{\Delta e_{uc}}}. \tag{35}$$

Eqns. (32), (34), and (35) provide a vehicle to translate between the lateral confinement factor and the guide width for either waveguide, given values for $\Delta e_{uc}$ and $\Delta e_{ug}$.

Figure 9:
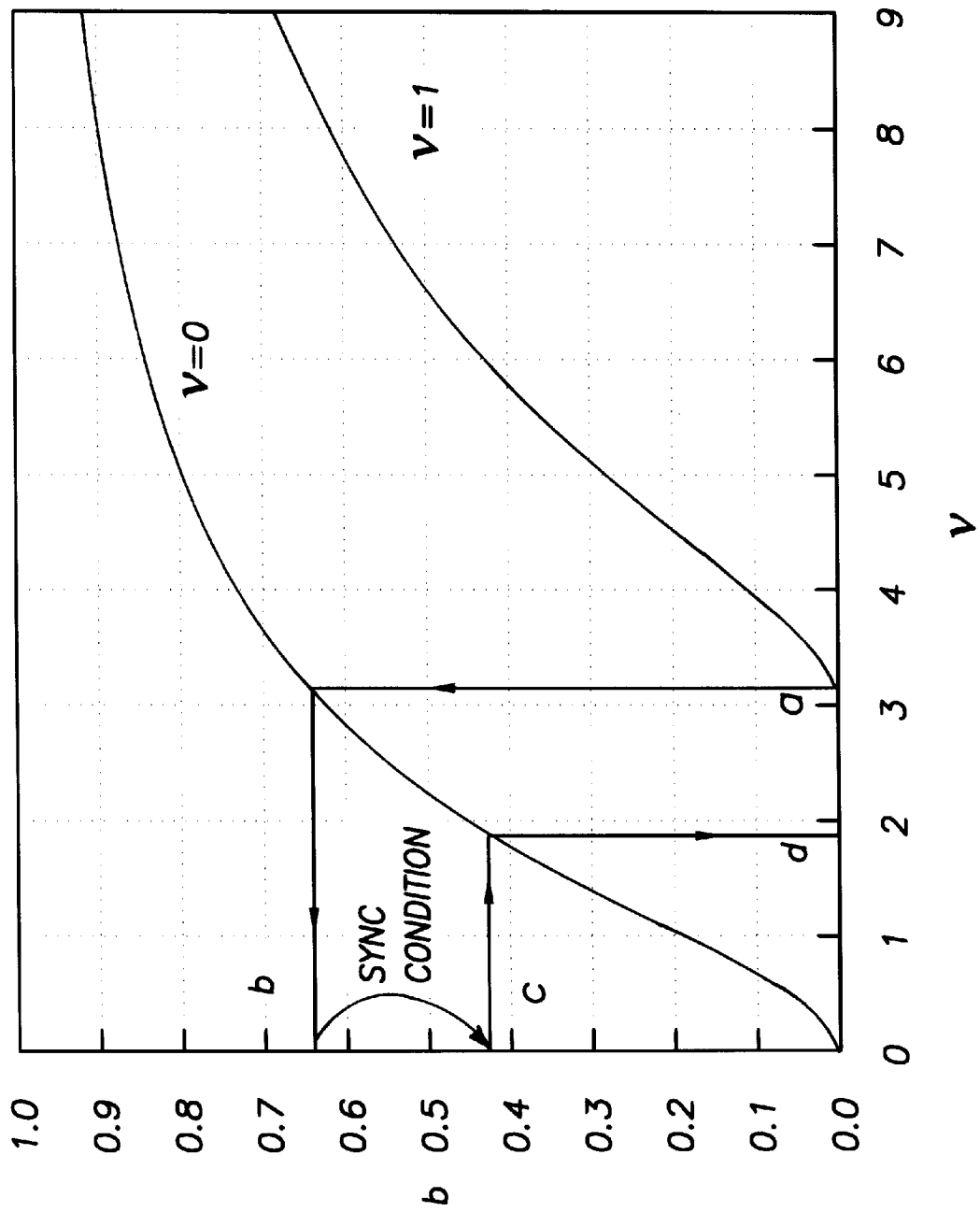
FIG. 9 is a plot of b factor as a function of V for determining waveguide widths in a design for which a synchronized operation is imposed.

FIG. 9 plots the normalized dielectric factor b for first and second order symmetric modes as a function of V in Eqn. (32). The procedure that is adopted in the following analysis to find the widths of the grating and center waveguides, under the condition of phase-velocity matching, is shown graphically on the figure. Point (a) on the plot indicates the V-value that is related to the width of the grating guide. Eqn. (32) is used to calculate the lateral dielectric factor $b_g$, indicated as point (b) on the plot. Then, Eqn. (31) is used to find the lateral dielectric factor of the center waveguide, $b_u$, under the constraint that the two guides are synchronous, that being indicated by point (c) on the plot. Finally, Eqn. (32) is again used in reverse to find the V-value, and hence the width, of the waveguide, as indicated by point (d) on the plot.

For design cases where the grating strength needs to be maximized, an abbreviated approach can be used. Here, the $b_g$ can be defined at the outset, say to $b_g=0.64$, and then $V_g$, $b_u$, and $V_u$ can be calculated.

In order to find waveguide widths $w_u$ and $w_g$ that result in a synchronous waveguide pair, first Eqns. (32–33) are combined to give the governing determinantal equation:

$$2\pi(w_u/\lambda_0)\sqrt{\Delta e_{uc}} = \frac{2}{\sqrt{1-b_u}}\tan^{-1}\sqrt{\frac{b_u}{1-b_u}}. \tag{36}$$

However, the values of $b_u$ are not arbitrary, but rather follow from the synchronization condition, Eqn. (31), and a given $b_g$. With the independent variable $b_g$ given, the two values in the system which must be determined are $\Delta e_{uc}$ and $\Delta e_{ug}$. Maximizing $\Delta e_{ug}$ with respect to $\Delta e_{uc}$, in order to maximize the grating strength, the relation between $b_u$ and $b_g$ is given as:

$$\frac{b_g - b_u}{1-b_g} = \sqrt{\frac{b_u}{1-b_u}}\tan^{-1}\sqrt{\frac{b_u}{1-b_u}}. \tag{37}$$

Once values for $b_g$ and $b_u$ are determined, the ratio of center waveguide to grating waveguide width is found by a relation given as:

$$\frac{w_u/\lambda_0}{w_g/\lambda_0} = \frac{V_u/\pi}{V_g/\pi}\sqrt{b_u/b_g}. \tag{38}$$

Given a full single-mode range of values for $b_g$, $0<b_g<0.6464$, the ratio in grating to center waveguide-width for a maximized value of grating strength is nearly 2.0 to within a few percent. Thus, a general rule, the ratio of waveguide widths should be a factor of two, while the absolute waveguide width is determined by the degree of core-to-clad index contrast the particular waveguide system can provide.

An alternative means to design synchronous waveguide pairs is available when it is not desired to maximize the grating strength for a particular core-to-clad index contrast. One reason a reduced grating strength design can be desirable is its ability to enable reduction of the aspect ratio of the grating teeth, as defined by the grating height divided by half the grating width. High aspect-ratio gratings can in some fabrication processes be difficult to lithographically define and fabricate and thus are generally not desirable.

To design a synchronous waveguide pair with a reduced grating strength, Eqn. (38) is first considered, with the width ratio being set to less than about 2:1, e.g., set to about 1.5:1. Then, those values of $b_u$ and $b_g$ are found which satisfy Eqn. (38). Finally, the corresponding values of $\Delta e_{uc}$ and $\Delta e_{ug}$ are determined so that the grating strength can be calculated.

To complete the waveguide design, the core layer thickness, the waveguide etch depths, and the grating etch depth are determined. While there are many geometric and optical parameters to be determined in a full design, only three variables are free to be defined by the waveguide designer: the core-to-clad dielectric difference $\Delta\epsilon$, the normalized center waveguide-stack dielectric constant $g_u$, and the grating duty cycle D. The remaining parameters are found using these three variables and the variables previously given, with all variable values taking into account for material and fabrication limitations, as is conventional.

The effective stack dielectric constants of the unetched and etched waveguide rib regions, corresponding, respectively, to the waveguide having no grating and that having a grating, are given as:

$$e_u = g_u(\epsilon_1 - \epsilon_0) + \epsilon_0; \tag{39}$$

$$e_c = g_c(\epsilon_1 - \epsilon_0) + \epsilon_0; \tag{40}$$

where $\epsilon_1$ and $\epsilon_0$ are the core and clad material dielectric constants, and $g_u$ and $g_c$ are the normalized unetched and etched stack dielectric constants. Given that $\Delta\epsilon=\epsilon_1-\epsilon_0$, then the normalized etched dielectric constant, $g_c$, is found from the difference of Eqns (39–40) as:

$$g_c = g_u - \frac{\Delta e_{uc}}{\Delta\varepsilon}. \tag{41}$$

Because the value of $g_c$ must be zero or positive, a lower bound on the $g_u\Delta\epsilon$ product is found as:

$$g_u\Delta\epsilon \geq \Delta e_{uc}. \tag{42}$$

Next, Eqn. (42) is manipulated to place a lower bound on the center waveguide width, $w_u/\lambda_0$, for a given $\Delta\epsilon$ as:

$$w_u/\lambda_0 = \left(\frac{V_u}{2\pi}\right)\sqrt{\frac{1-b_u/b_g}{g_u\Delta\varepsilon}}. \tag{43}$$

The heights of the unetched and etched waveguide sections are found using the expression for the normalized variable W (compare Eqn. (33)):

$$h_u/\lambda_0 = \frac{W_u/\pi}{2\sqrt{\Delta\varepsilon}} \tag{44}$$

$$h_c/\lambda_0 = \frac{W_c/\pi}{2\sqrt{\Delta\varepsilon}}; \tag{45}$$

where the variable W is the vertical equivalent of lateral variable V, and is determined by Eqn. (32).

It is a more complicated matter to find the appropriate grating depth, $h_g/\lambda_0$. In order to do so, the expression that relates the change in dielectric constant to the presence of a grating, Eqn. (27), is used. Here the relation to be satisfied is given as:

$$\Gamma_y = \frac{\Delta e_{ug}}{(1-D)\Delta\varepsilon}; \tag{46}$$

under the condition that $h_u = h_1 + h_2$. The functional dependencies of the vertical-slab field grating-overlap, $\Gamma_y$, are expressed as:

$$\Gamma_y = f(g_u, \Delta\epsilon, \Delta e_{ug}, D, h_u/\lambda_0, h_u/\lambda_0); \tag{47}$$

where $h_u/\lambda_0 = f(g_u, \Delta\epsilon)$. Because $g_u$, D, and $\Delta\epsilon$ are independent variables, $h_u/\lambda_0$ is a function of these independent variables, and $\Delta e_{ug}$ is determined from the lateral design methods, the only remaining dependent variable is $h_g/\lambda_0$. The full expression for the overlap integral $\Gamma_y$ can be found by using multilayer dielectric stack theory, where the top and bottom dielectrics are the upper and lower cladding, respectively, the inner two dielectrics are the core and average grating dielectrics, and the slab mode is the fundamental bound mode.

Turning to design of the remaining component of the add/drop switch, namely, the interferometer switch, in one example embodiment in accordance with the invention, the interferometer switch is a Mach-Zehnder switch. As explained earlier and shown in FIGS. 3–4, the interferometer switch 34 includes an input evanescent coupling region 37 having two input waveguides 16, 20, and an output coupling region 38 having two output waveguides 22, 24, for producing a 2×2 spatial switch.

In design of the interferometric spatial switch, the two arms that separate the input and output coupling regions are each designated to be of an identical arm length, $L_a$. On at least one of the two interferometric arms a control is placed to impart a phase shift on the effective refractive index of the optical mode guided by each of the arms. The control can be provided as, e.g., a thermal heating pad, to induce a thermo-optic phase shift, alternatively as, e.g., an electrode, to induce an electro-optic phase shift, or as another other type of phase control. In general, a phase controller can be placed on both arms for either redundancy or more complex control.

Figure 10A:
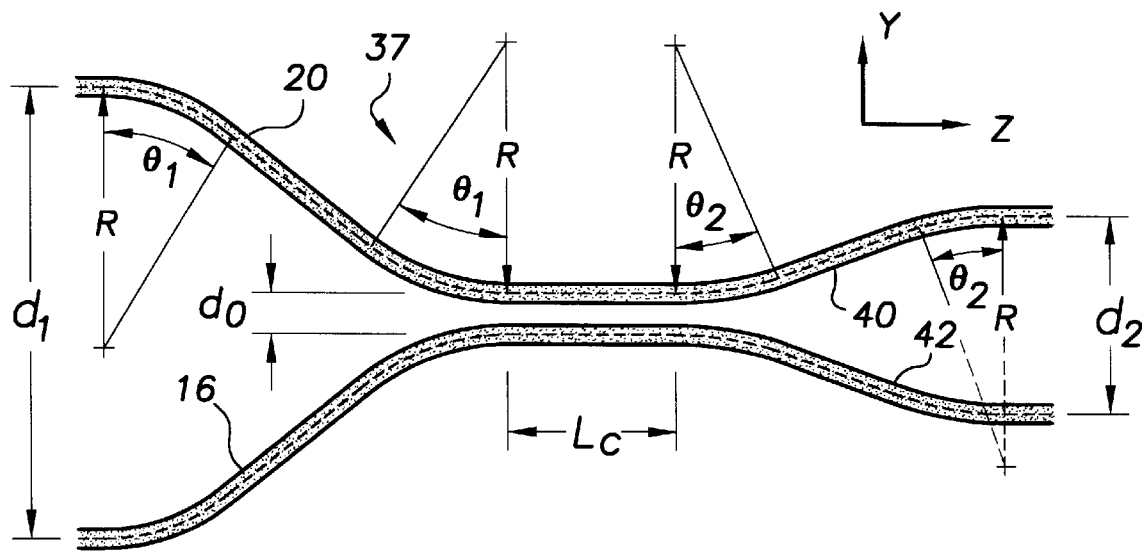
FIG. 10A is a detailed schematic diagram of the geometric parameters of an optical coupling region of an interferometric switch employed in the add/drop switch implementation of FIG. 3.

Considering the design of the interferometer coupling regions, FIG. 10A shows details of one of the couplers, namely, the input coupling region 37. The dimensions of the coupler to be determined, given known values for $d_1$ and $d_2$, the farthest distance of separation of the two input waveguides 16, 20, and the farthest distance of separation of the two interferometer arms 40, 42, respectively, are $d_0$, the distance between the waveguides in the coupling region 37; R, the radius of curvature of the waveguides as they make the transition to and away from the coupling region; $\theta_1$, the input angle of curvature of the waveguides to the coupling region; $\theta_2$, the output angle of curvature of the waveguides out of the coupling region; and $L_c$, the length of the coupling region. Preferably, the couplers are designed such that each is a 50/50 coupler, i.e., that 50% of the optical power on one waveguide is transferred to the other at the end of the coupling region, and that the total loss through the coupler is minimized. The two sources for loss are radiation loss around the bends and propagation loss along the length.

To begin the coupler design analysis, consider two individually-identifiable forward-traveling optical modes, $a_1$ and $a_2$; $|a_1|^2$ and $|a_2|^2$ are given as the modes normalized to optical power. These modes are brought in spatial proximity by the evanescent coupler waveguides so as to evanescently exchange optical power. The optical amplitudes of the two modes at the output of the coupler are related to the input amplitudes, given that an adiabatic approximation is valid where the movement of the two waveguides is assumed slow compared with the wavelength of the light, as:

$$\begin{bmatrix} a_1(L) \\ a_2(L) \end{bmatrix} = \exp[-2j\beta_0 L] \times \begin{bmatrix} \cos\phi & -j\sin\phi \\ -j\sin\phi & \cos\phi \end{bmatrix} \begin{bmatrix} a_1(-L) \\ a_2(-L) \end{bmatrix}; \quad (48)$$

where $\beta_0$ is the propagation constant of the two waveguides, assumed here to be the same for the two waveguides, and the integrated coupling phase, is defined as $$\phi = \int_{-L}^{L} \mu(z)dz; \quad (49)$$

and where the waveguide-waveguide coupling strength is denoted by $\mu$. Note that mode orthogonality is strictly enforced in this equation and corrections must be made to very strongly coupled waveguide pairs. The waveguide coupling strength is a function of the waveguide separation, which itself is a function of length for the coupler geometry being discussed. It is often possible to approximate the coupling strength as:

$$\mu(y(z)) = \mu_0 e^{-y(z)/\bar{d}}; \quad (50)$$

where the values $\mu_0$ and $\bar{d}$ are evaluated from a best-fit estimate to the theoretically-calculated values.

Consider a coupler in which the input and output waveguide separations are equal. In this case, the coupler is composed of three distinct sections: two linear approach/withdraw segments, two quadratic approach/withdraw segments, and one parallel segment. Each segment contributes to the total integrated coupling. The contribution from the parallel segment is denoted as $\phi_0$, the contribution from each quadratic segment is given as $\phi_1/2$, and the contribution of each linear section is given as $\phi_2/2$. The total coupling phase is then given as $\phi_{tot} = \phi_0 + \phi_1 + \phi_2$.

The separation function between the two guides, y, as a function of z is given by $$y(z) = \begin{cases} d_0 & |z| < L_c/2 \\ d_0 + 2R - 2\sqrt{R^2 - (|z| - L_c/2)^2} & L_c/2 < |z| < L_c/2 + R\sin\theta \\ d_0 + 2R(1 - \cos\theta) + & L_c/2 + R\sin\theta < |z| \\ 2(|z| - L_c/2 - R\sin\theta)\tan\theta \end{cases} \quad (51)$$

In principle, the waveguides need not separate to infinity away from the coupler; once the waveguides have attained a sufficient separation, the waveguide coupling becomes negligible and therefore the exact functional for the y(z) outside of the primary coupling region is not important.

Integration of the coupling phase across the three main regions, linear, curved, and parallel, results in distinct contributions from each segment. For most cases, the optical parameters of the coupler are such that only contributions from the parallel and curved regions are significant. In this case, the total coupling simplifies to:

$$\begin{aligned} \phi_{tot} &= \mu(d_0)\left[L_c + \sqrt{\pi \bar{d} R}\right] \\ &= \mu(d_0)L_{eff}. \end{aligned} \quad (52)$$

The simple form of Eqn. (52) indicates that under the above conditions, the coupling between two non-parallel waveguides can be treated as if the coupler were formed of two parallel waveguides separated by $d_0$ and with effective coupling length $L_{eff}$. In order to find the correct effective coupling length for a 50/50 coupler, one sets $\phi_{tot} = \pi/4$. Then, given R and $\bar{d}$, the length $L_c$ can be determined.

To summarize this coupler design process, the length $L_c$, radius R, and total coupling phase are related to each other. The additional terms $\mu(d_0)$ and $\bar{d}$ are then found from the specific waveguide geometries. A value of $d_0$ should preferably be chosen so as to avoid non-orthogonality between the two optical modes.

Figure 10B:
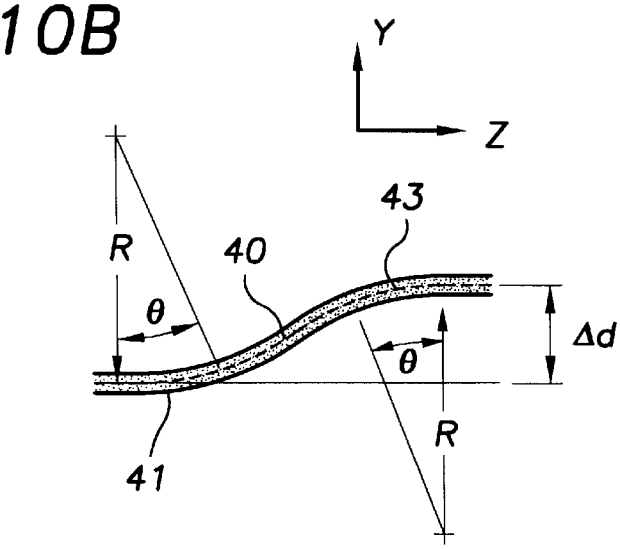
FIG. 10B is a schematic diagram of an S-bend section of the coupling region of FIG. 10A.

FIG. 10B shows one segment of the coupler in FIG. 10A, that segment being the output of the coupler leading to the first interferometer arm 40. This segment is called an S-bend. Both arc sections 41, 43, of the S-bend have a radius R and sweep an angle $\theta$. The vertical displacement is given as $\Delta d$. There are two forms of optical loss from the S-bend that are preferably considered, namely, radiation loss from the arcs, and pathlength loss along the entire length. $\alpha_r$ and $\alpha_r$ are denoted as the loss per unit length for the radiation and propagation loss components, respectively. The total loss is then given as:

$$G(\theta, R; \alpha_r, \alpha_p) = \alpha_r s_{bend} + \alpha_p s_{total}; \quad (53)$$

where $s_{bend}$ and $s_{total}$ are the path lengths given by $$s_{bend} = 2R\theta \quad (54)$$

$$s_{total} = 2R\theta + \frac{\Delta d - 2R(1 - \cos\theta)}{\sin\theta}.$$

If the path-length loss term, $\alpha_p$, is zero, then G is minimized by choosing a very large radius R. Conversely, if the radiation loss term, $\alpha_r$, is zero, then G is minimized with very small values of R. Because, as a practical matter, neither $\alpha_r$ nor $\alpha_p$ are zero, some intermediate values of R and $\theta$ yields a minimum in G.

To find that minimum, G is first minimized with respect to $\theta$ by taking $dG/d\theta$ from Eqn. (53). Setting $dG/d\theta=0$, expanding $\cos\theta$ to second order, and dropping terms of order $(\Delta d/R)^2$ and higher, the optimal bend angle for a given value for R and given values for $\alpha_r$ and $\alpha_p$ is then given as:

$$\theta_{opt} = \sqrt{\frac{\Delta d}{R}\left(1 + 2\frac{\alpha_r}{\alpha_p}\right)^{-1}}. \quad (55)$$

Next, G must be minimized with respect to radius, R. Because the value of $\alpha_r$ is itself a function of R, and possibly a non-trivial function, $G(\theta_{opt}, R, \alpha_r(R); \alpha_p$ is best minimized numerically.

Considering the preferred length of the interferometer arms, it is noted that the phase controller placed on one or both of the interferometer arms must be able to impart a relative $\pi$ phase shift of one mode with respect to the other over the arm length between the two evanescent couplers. Given that the controller in one arm can induce an effective refractive index change $\Delta n$, then the length of the two interferometer arms is given as:

$$L_a = \frac{\lambda_0}{2\Delta n}; \quad (56)$$

where $\lambda_0$ is the operating wavelength. In one example, the relative change in effective refractive index is 0.001. The length $L_a$ at 1.55 $\mu$m is then approximately 775 $\mu$m. As a practical matter, one must ensure as large as possible a degree of isolation between the two interferometer arms so that a thermally- or electrically-induced phase shift on one arm does not impart a nearly equal phase shift of the other arm.

With this understanding of the add/drop switch design criteria, next is presented a discussion of one example fabrication process for producing the switch. It is to be understood that a range of fabrication processes can be employed and that the one described is presented as an example of this range.

First referring back to FIG. 5B, the add/drop switch is fabricated with waveguide sections 12 and Bragg grating waveguide sections 33, 35, to form the CDF, and similarly, the CAF; and is fabricated with other suitable configured waveguide sections to form the interferometric switch and branching waveguides. As shown in FIG. 5B, in one example configuration, the waveguides are produced as a core dielectric layer 50 that is "sandwiched" between upper and lower cladding dielectric layers 52, 54, respectively, all supported on a substrate 56. The cladding layers are selected to have a lower effective index of refraction than the core layer for vertically confining optical energy in the core layer.

In one example material system, the cladding layers as well as the substrate are indium phosphide (InP), with the lower cladding layer of a thickness of at least about 6 $\mu$m and the upper cladding layer of a thickness of at least about 4 $\mu$m. The core layer here is indium gallium arsenide phosphide (InGaAsP) and is of a thickness of between about 0.8 $\mu$m–1.5 $\mu$m. In a second example material system, both the cladding layers and the core layer are silicon dioxide; the core layer is defined by a germanium- or phosphorus-doped layer of at least about 2 $\mu$m in thickness. The lower cladding layer is then defined as having a thickness of at least about 15 $\mu$m, and the upper cladding layer is defined as having a thickness of at least about 5 $\mu$m. The upper cladding layer can be doped with, e.g., boron, as long as the refractive index of the doped layer nearly matches that of the lower cladding layer, to decrease the doped layer's melting point below that of the lower cladding layer, as is conventional.

Whatever material system is employed, the add/drop switch fabrication primarily requires patterning and etching of a core layer to define waveguide ribs in the layer and to define gratings on selected of the ribs. The depth of the waveguide ribs exceeds that of the grating patterns on the ribs such that guided mode operation is enabled. A multi-step lithography and etching process is required to achieve this geometry. It has been recognized that the fabrication of waveguide ribs and gratings at the dimensions required for typical Bragg grating operation is quite difficult. In particular, it is difficult to produce a grating of sufficient length that exhibits the requisite optical coherence for intended grating functionality.

The invention provides a particularly elegant fabrication sequence for enabling the production of gratings on a waveguide rib in a self-aligned manner, and further provides a process for producing requisite lithographic masks employed in the fabrication sequence. In the fabrication process of the invention, the waveguide rib pattern and the grating patterns are provided in separate lithographic masks, with the waveguide rib pattern on an optical mask and the grating pattern on an x-ray mask. Alternatively, a phase mask can be employed for the grating patterns, but in either case, e-beam lithography (EBL) is preferably employed, as explained below, to produce the grating masks.

The fabrication process enables performing both the optical and the x-ray or phase mask lithography on a planar surface, with the grating patterns residing exclusively on top of the waveguide ribs. This enables greatly enhanced misalignment tolerance and etch precision. Misalignment tolerance is further enhanced using a self-aligned mask pattern described below. In combination with the fabrication processes, the mask production technique provided by the invention results in gratings that exhibit a long-range optical coherence of better than about $\lambda/60$.

Figure 11A:
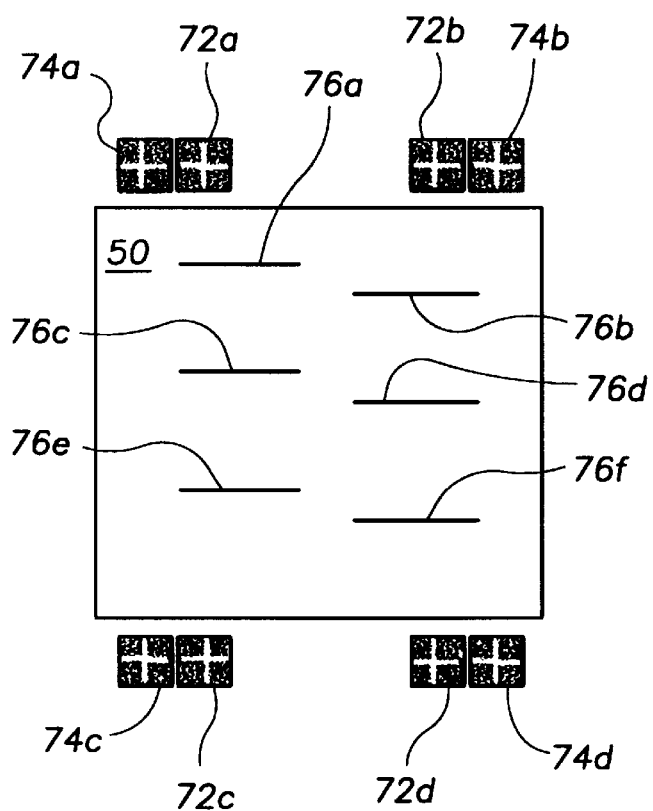
FIGS. 11A–11G are masking patterns and corresponding waveguide and grating patterns produced by an add/drop switch fabrication sequence provided by the invention.

In a first step of an example fabrication process, a lower cladding layer of InP is produced having the requisite thickness on a substrate, e.g., an InP substrate. Then the core layer, e.g., an InGaAsP layer, of the requisite thickness, is produced on the lower cladding layer. Referring to FIG. 11A, the core layer is then coated with photoresist, e.g., a resist that is sensitive to both UV and x-ray irradiation, such as polymethylmethacrylate (PMMA), or other suitable resist, and is lithographically patterned, using an optical mask, to produce for each device field four inner alignment reference patterns 72a–72d and four outer alignment reference patterns 74a–74d. The photoresist is patterned such that the core layer 50 is exposed in the field and photoresist remains only in the areas 76a–76f at which gratings are to be formed. The figure illustrates an example subsection of the full add/drop switch pattern, here showing only three pairs of grating areas, each pair corresponding to one CDF, for a process in which multiple copies of each device are produced for redundancy. The photoresist areas 76a–76f duplicate the intended grating lengths but are preferably wider than the intended waveguide rib width on which the gratings are to reside, to increase tolerance for lithographic misalignment in later steps.

Figure 11B:
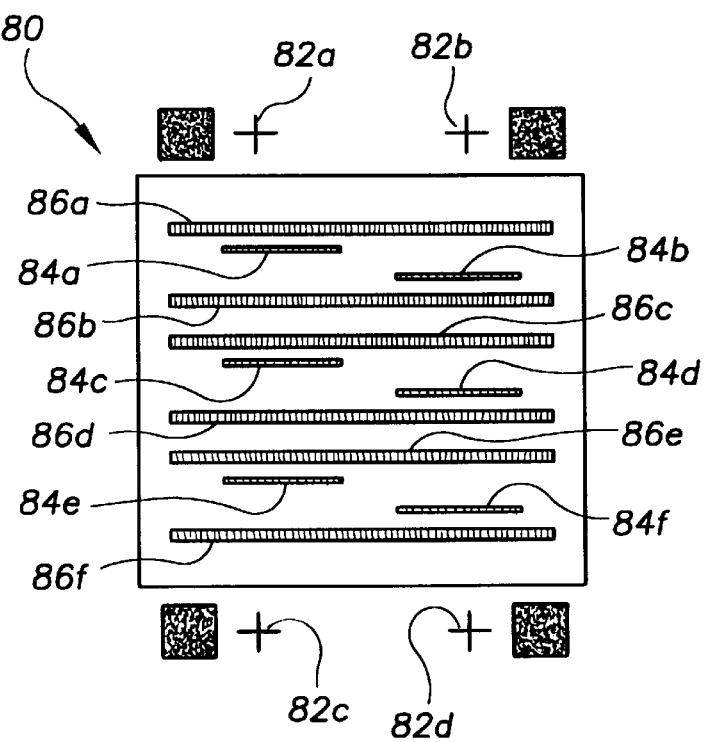

In a next process step, the patterned core layer is then patterned using, e.g., an x-ray mask like that of FIG. 11B, with the x-ray mask 80 having four alignment patterns 82a–82d that correspond to the inner alignment reference patterns 72a–72d already formed on the core layer. This mask provides grating patterns 84a–84f that correspond to the photoresist areas 76a–76f. The mask also includes fiducial grating patterns 86a–86f that are employed during the mask production process. The mask production process provided by the invention will be described below.

Figure 11C:
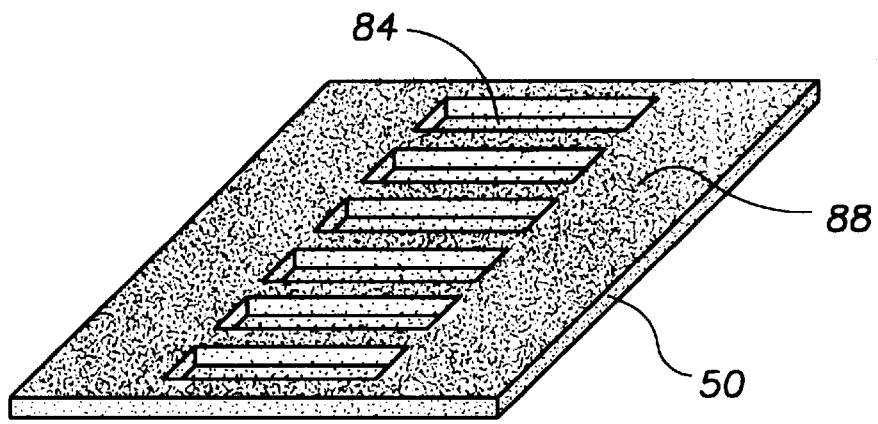

With the x-ray mask 80 aligned to the core layer alignment reference patterns, exposure at 1.3 nm x-rays through the mask is completed. After development of the exposed photoresist, a layer of metal or another suitable material is deposited on the patterned core layer and patterned using, e.g., a conventional lift-off process, to produce a hard grating mask. As shown in FIG. 11C, the hard mask 88 provides a planar surface having a periodic aperture pattern corresponding to an inverse of the intended grating pattern 84.

Figure 11D:
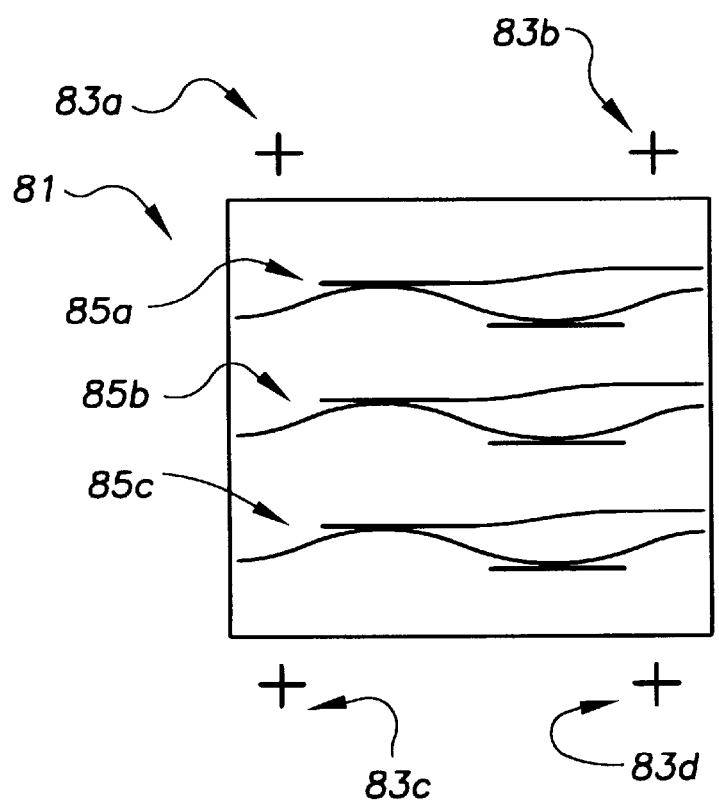

At this point, a second hard mask material is deposited on the first patterned hard mask. The hard mask materials are preferably selected such that either mask can be removed by way of wet or dry etching without damaging the other mask or the underlying core layer. One example mask material system employs tungsten or silicon as the first mask layer material and silicon dioxide as the second mask layer material. A layer of photoresist is then applied over the second hard mask, and as shown in FIG. 11D, an optical mask 81 including waveguide rib patterns and having alignment patterns 83a–83d corresponding to the outer alignment reference patterns 74a–74d is aligned not to the grating mask 80, but rather, to the core layer 50.

Figure 11E:
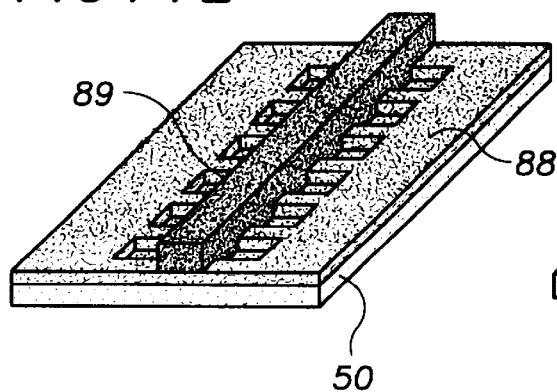
Figure 11F:
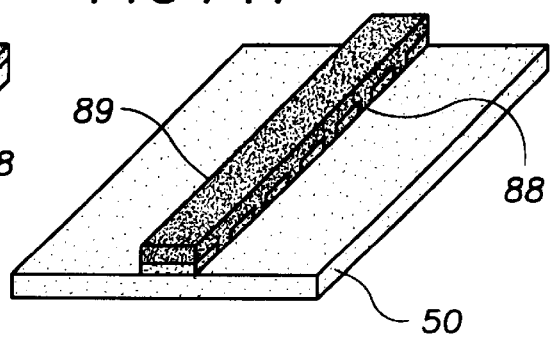

Once aligned, exposure through the grating mask 81 is completed using visible or near-UV light to produce waveguide rib patterns 85a–85c in the photoresist. Referring to FIG. 11E, after developing the exposed resist, the photoresist is employed as an etch mask for reactive-ion etching of the second hard mask layer 89, whereby a waveguide rib pattern is formed over the inverse grating pattern in the first hard mask 88. Then, after stripping the photoresist, as shown in FIG. 11F, the first hard mask layer is stripped in the field areas, with the second hard mask layer masking the first hard mask layer area under it. This results in a patterned waveguide rib mask layer 89 over a patterned grating mask layer 88.

Figure 11G:
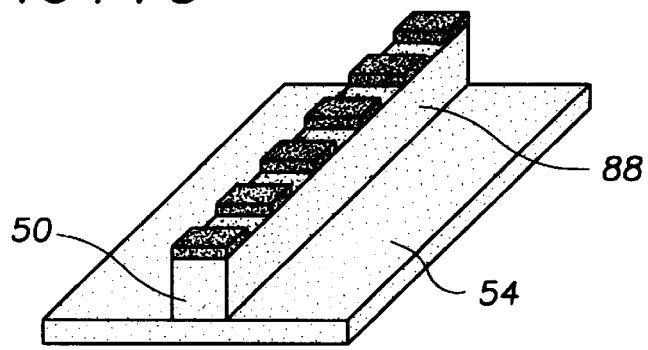

With this last lithography step completed, the grating and waveguide rib patterns are etched into the core layer. First, the waveguide rib pattern is etched using the upper second hard mask 89 as the etch mask for etching the core layer. The second hard mask is then stripped, as shown in FIG. 11G, revealing the patterned first hard mask 88, now located on top of the waveguide rib core 50. If a channel guide design is employed, then the waveguide pattern etch can be extended through the thickness of the core layer to expose the lower cladding layer 54 as shown in the figure. If instead, a waveguide rib design like that in FIGS. 7A–B is employed, then the waveguide pattern etch preferably extends to a depth in the core layer that is less deep than the intended rib depth to accommodate the next grating etch step.

In this grating etch step, which is the final etch step, the first hard mask 88 is employed as an etch mask for etching the grating into the waveguide ribs. In this etch, the waveguide rib depth is increased; in the rib design, this increased etch depth is accommodated for by a reduced etch depth in the prior waveguide etch step. If a channel waveguide design is employed, whereby the grating etch will etch into the lower cladding layer, no special precaution need be taken because etching into the cladding layer has no substantial impact on optical mode operation. If, however, such extra etching is undesired, the etch depth of the waveguides can be reduced by the grating depth. Once the grating pattern is etched in the waveguide ribs, the first hard mask is stripped and the core fabrication is complete. An upper cladding layer is then deposited on the core layer and final packaging of the switch is undertaken.

It is here noted that this fabrication sequence overcomes many of the obstacles encountered in conventional fabrication processes that attempt to pattern gratings on nonplanar structures. Nonplanar lithography is eliminated in the process provided by the invention, resulting in lithography and etch steps that are not encumbered by topological features. The initial patterning of the core layer with alignment patterns and with grating area patterns enables a self-aligned process in which the waveguide rib and grating masks do not need to be aligned to each other. The grating pattern is then inherently aligned to the shape and location of the waveguide rib patterns within a relatively large process latitude.

The invention provides a particularly elegant technique for producing an x-ray mask for the grating pattern. As explained above, the optical coherency of the grating along the length of the grating is directly impacted by the precision with which the grating mask is produced. The mask production is limited in that to produce a 240 nm period grating for an InP add/drop switch, or to produce a 530 nm period grating for a silicon dioxide add/drop switch, EBL is required for requisite pattern resolution. Moreover, EBL is preferably employed to enable production of arbitrary patterns, such as the abrupt quarter-wave shift in the Bragg gratings, and to enable production of gratings with arbitrary periods; EBL is characterized by a degree of flexibility that can accommodate such patterns. However, EBL is limited in that a long pattern, e.g., a 1 mm-long grating, cannot be written in one unitary segment without significant intra-field distortion, and thus several segments, each, e.g., about 0.1 mm-long, must be instead separately produced. As the separate grating segments are written, they must be aligned to each other at the field boundaries. Any positional error at a field boundary can produce a corresponding phase error along the produced gratings, resulting in degrading of the optical coherence across the grating length.

In the mask production of the invention, spatial-phase-locked e-beam lithography (SPLEBL) is employed. SPLEBL requires coherent fiducial grating reference patterns for deriving a direct positional reference between the e-beam and the surface of a wafer or mask. With fiducial references available, SPLEBL can be employed to write gratings of arbitrary period and having arbitrary phase shifts while maintaining field-boundary misalignments to less than about 10 nm. In the invention, a combination of optical and EBL is employed to produce the fiducial references, with SPLEBL then employed to produce the gratings.

Figure 12A:
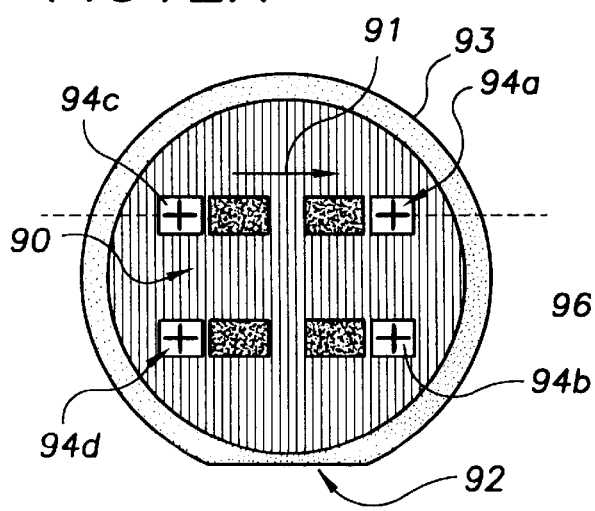
FIGS. 12A–12F are masking patterns to be employed in an x-ray mask fabrication sequence provided by the invention.

The x-ray mask fabrication process is begun by coating a blank x-ray mask, having a conductive plating base, with a photoresist layer. Referring to FIG. 12A, a grating pattern 90 is then replicated in the photoresist using interferometric lithography, whereby a latent image of the grating is produced in the photoresist. The period of the grating is approximately, but not necessarily exactly, that of the intended grating period. The k-vector 91 of the patterned grating is approximately aligned to the flat 92 of the x-ray mask 93. A dark-field optical mask having alignment marks corresponding to the x-ray mask flat 92 is then overlaid prior to development of the photoresist. The dark-field mask includes four open areas 94a–94d, each, e.g., about 200×200 $\mu$m square. The mask is then exposed a second time. After development, the grating 90 patterned in the photoresist exists everywhere on the face of the x-ray mask except the in the four open areas. The x-ray mask is then electroplated with gold or other suitable metallic absorber, such as tungsten, and the photoresist is removed, whereby gold gratings exist everywhere except in the open areas, where a solid layer of gold now exists.

At this point, the x-ray mask is then daughtered to a second x-ray mask. The latter mask is subsequently electroplated to reverse the mask polarity. With the polarity reversal, the open areas 94a–94d are free of the opaque gold layer, although a gold plating base remains. The second x-ray mask is then coated with photoresist and configured in the EBL system. The EBL system is employed to write an alignment mark in each of the open areas 94a–94d; these marks are employed in a later step for alignment with a third x-ray mask. Importantly, the alignment patterns are here provided as themselves being aligned to the grating already on the mask by location of a single grating line and alignment to that one line as all four alignment patterns are produced; this ensures a high degree of alignment accuracy of the grating k-vector to the patterns in the third x-ray mask. Solid blocking patterns are also produced adjacent to the alignment marks so that alignment marks to be subsequently added are not patterned over.

Figure 12B:
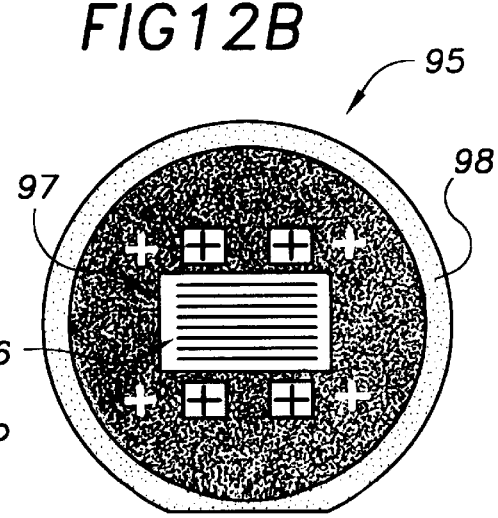

Referring to FIG. 12B, a third x-ray mask 95 is coated with photoresist and a dark-field optical mask is employed to produce a series of fiducial rectangles 96 in the region 97 of the waveguides; suitable fiducial rectangles can be between about 4–10 $\mu$m-wide and preferably as long as the gratings to be written using SPLEBL. The fiducial rectangles preferably are provided in a pattern that forms parallel pairs, with the separation between two rectangles in a pair not exceeding the field of the view of the e-beam system, e.g., about 100 $\mu$m. The dark-field mask also produces alignment patterns 98 for subsequent alignment of the second x-ray mask to the third x-ray mask, as well as for aligning to the core layer alignment reference pattern, shown in FIG. 11A.

The second x-ray mask is then overlayed and aligned to the third x-ray mask 95. An x-ray source is employed to expose the resist remaining on the third x-ray mask through the second x-ray mask. After exposure and development of the third x-ray mask, the waveguide area is clear of resist except in the fiducial rectangle pair areas, where gratings have now been patterned. Note that the gratings in the fiducial rectangles are each highly coherent, as guaranteed from the interferometric lithography step, and are further mutually coherent.

Figure 12C:
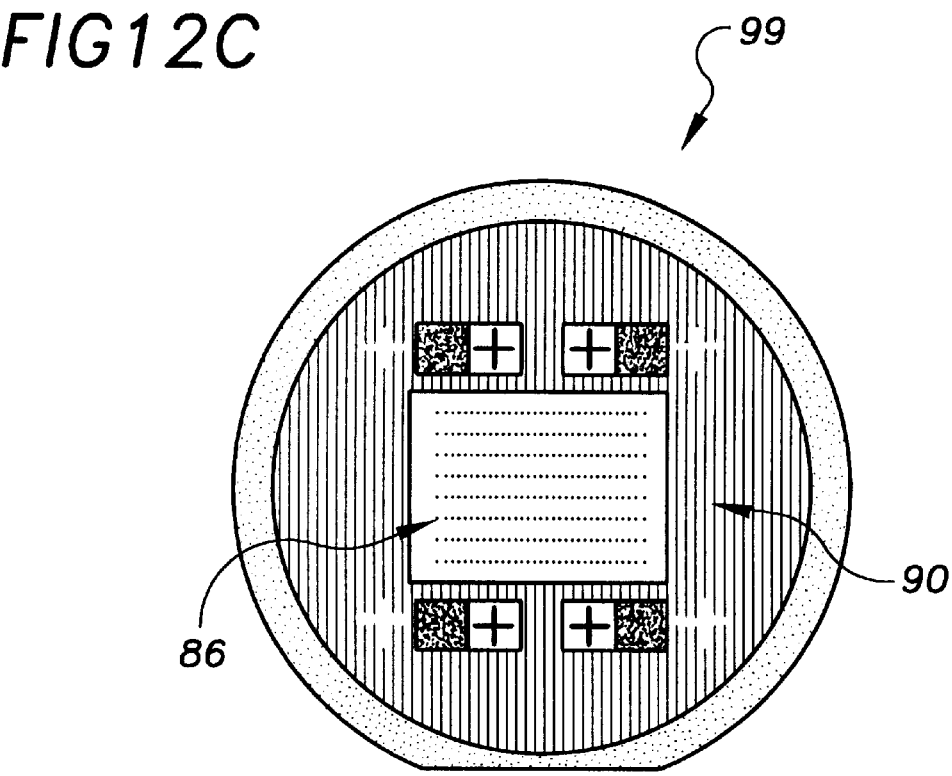
Figure 12D:
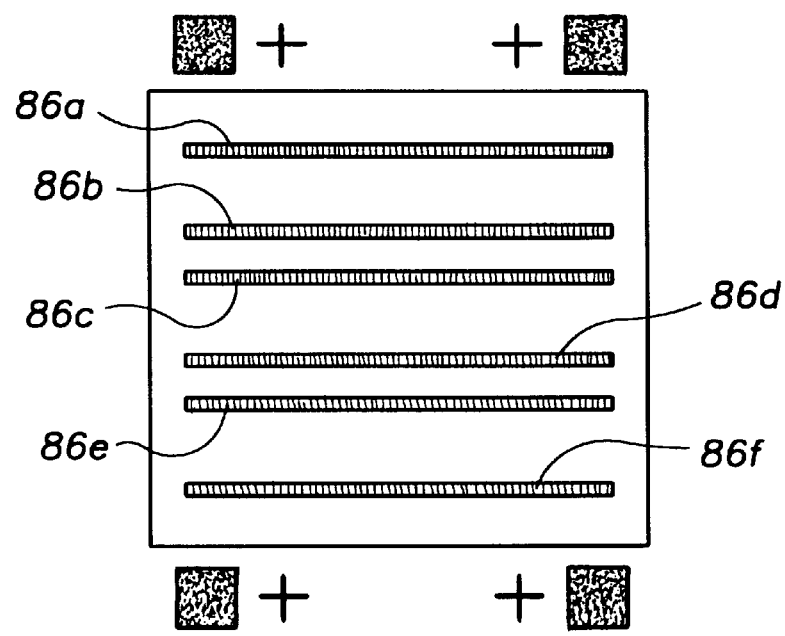
Figure 12E:
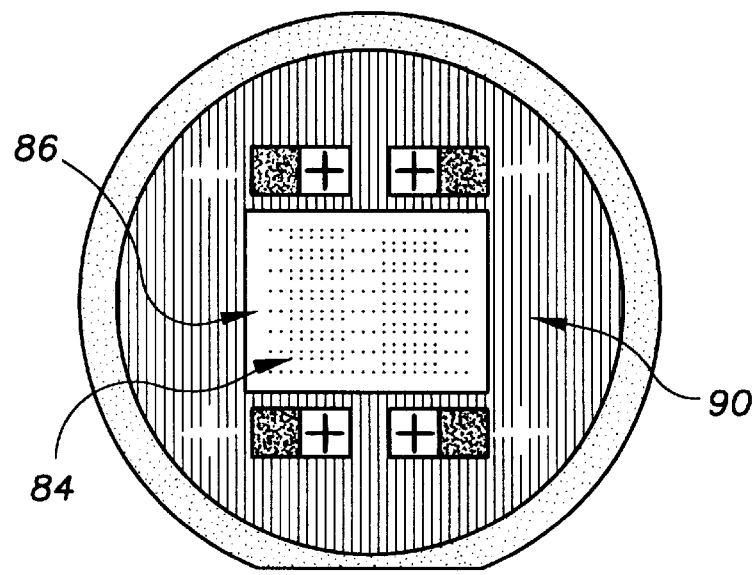
Figure 12F:
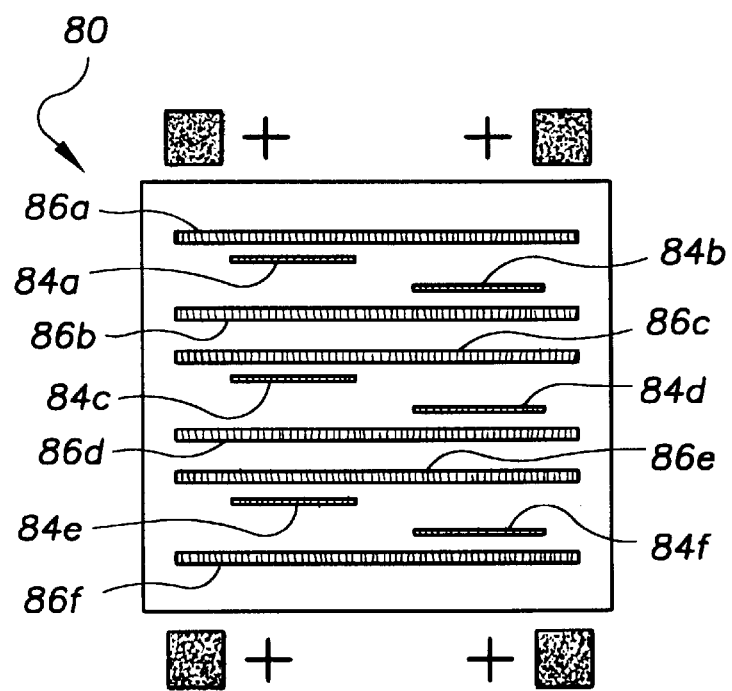

The third x-ray mask 95 is then electroplated with gold, and then is daughtered to a fourth x-ray mask. This latter mask 99 is then developed and plated, as shown in FIGS. 12C and 12D, and whereby the fourth x-ray mask provides fiducial reference gratings 86a–86f. The fourth x-ray mask is at this point ready for SPLEBL writing of the device gratings. Referring to FIGS. 12E and 12F, the device gratings 84a–84f are written using the fiducial gratings 86a–86f as reference marks. The device gratings can have arbitrarily-selected QWS locations, grating period, and grating placement, given that the device gratings are limited to the mask regions between the fiducial gratings. Details of the use of the fiducial reference marks in the SPLEBL process are given by Smith et al. in U.S. Pat. No. 5,136,169, issued Aug. 4, 1992, and entitled "Energy Beam Locating," the entirety of which is hereby incorporated by reference. Once the SPLEBL-written gratings are completed, the mask is replaced and cleaned for used as the grating mask 80 in the switch fabrication sequence outlined above.

Considering the design and corresponding operational performance parameters of an add/drop switch in accordance with the invention and implemented based on the preceding design and fabrication discussion, the example switch implementation assumes use of resonant add/drop filters and an interferometric switch. The material system of the example switch is the indium gallium arsenide phosphide (InGaAsP) on indium phosphide (InP) compound semiconductor material system. The switch fabrication with this material system employs crystalline deposition of InP, the lower dielectric cladding, on an InP substrate, by means of gas-source molecular-beam epitaxy, metal-organic chemical-vapor deposition, or other suitable processes. Because in this system the first epilayer is the same material as the substrate, it is not essential to deposit several microns to define the lower cladding; rather, a thin buffer layer to create an atomically smooth and clean surface is all that is necessary. Next, without removal of the substrate with InP epitaxial lower cladding layer from the deposition system, a quaternary InGaAsP compound semiconductor core dielectric layer of about 1.1 $\mu$m in thickness is deposited in lattice-matched fashion on the InP and with an As mole fraction of about 18%. This core layer is designed to have a core-to-clad optical refractive index contrast of about 2% for light at a wavelength of about 1.55 $\mu$m.

In the design of this example implementation, the resonator-waveguide to center-waveguide width ratio is selected to result in a reduced grating strength such that the aspect ratio of the grating teeth can be reduced. Where a higher grating strength corresponds to 2:1 width ratio yields and 5.6:1 aspect ratio for the grating teeth, a 1.15:1 width ratio yields an aspect ratio of about 1.64:1. The center waveguide and resonator waveguide widths for this lower width ratio are 1.3 and 1.5 $\mu$m, with corresponding lateral normalized effective refractive indices, b, of 0.600 and 0.564, respectively. The vertical dimensions of the waveguides are given in accordance with the previous discussion of synchronous waveguide design where, for the design presented here, a channel-waveguide geometry is preferred. The channel geometry differs from the rib-waveguide geometry in that the waveguide depth is the full depth of the core layer, rather than some fractional depth. There are fabrication-related as well as optically related advantages of the channel configuration. First, without a channel geometry, both the rib etch depth and the grating etch depth are preferably controlled to within a few percent of the target depth. However, with a channel geometry, the only nominal requirement on the 'rib' etch depth is that the entire core layer be etched through. Any further etching into the lower cladding, in principle, does not effect the optical performance of the waveguide, as explained above. Thus only the grating etch depth need be controlled precisely in this configuration.

Second, the channel geometry results in a modal confinement that is greater than that resulting from a rib geometry, allowing smaller bend radii for the same bend loss, which in turn reduces the necessary add/drop switch chip size. Moreover, the optical mode of the channel geometry is relatively more round so as to increase mode-profile overlap with an optical fiber mode and so as to reduce the polarization-dependence of the waveguide.

Using a channel geometry, the waveguide depth in the example implementation is the full 11 $\mu$m depth of the core layer thickness. The grating depth to achieve a synchronous center-waveguide and resonator-waveguide pair operation is approximately 0.2 $\mu$m. The effective refractive indices of the center waveguide and resonator waveguide modes are calculated with a semi-vectorial mode solver to be 3.185662 and 3.185494, respectively, with a difference in effective indices of 0.00017. The corresponding group effective refractive indices are estimated to be 3.235670 and 3.227742, respectively. Assuming a rectangular grating corrugation pattern and a grating duty cycle of 50%, the grating strength is estimated from the semi-vectorial mode solver and applicable coupled-mode theory to be about 58.5 cm$^{-1}$, yielding a Bragg stopband width of about 173 GHz, or 1.40 nm, at 1.557 micron operating wavelength. The grating period to match a 1.557 micron operating wavelength is 244.39 nm. The aspect ratio of the grating teeth, as defined by the tooth depth divided by one half the grating period, is then given as about 1.64.

Using Eqn. (8) as a functional form of the waveguide-waveguide evanescent coupling strength between a center waveguide and a resonator waveguide located in side-by-side evanescent coupling proximity, as a function of separation s, where s is the inner-wall to inner-wall distance, $\mu_0$ and $\alpha$ are estimated from a semi-vectorial mode solver and applicable coupled-mode theory to be 330.0 cm$^{-1}$ and $-1.52$ micron$^{-1}$, respectively. For example, an inner-wall to inner-wall separation of 2.0 $\mu$m yields an estimated coupling strength of 15.8 cm$^{-1}$.

The radiation loss along a bend region of radius R as given in decibels per degree of arc is functionally approximated by the expression: a exp( b R). The coefficients a and b for the center waveguide, as estimated from a resonant scattering method, are 1.4711 dB/deg and $-0.0117 \mu$m$^{-1}$. For example, an arc radius of 400 microns gives an estimated loss of 0.012 dB per degree of arc.

With these specific implementation criteria, resonant channel-add and channel-drop filters can then be given for the example implementation. A resonant optical receiver, or resonant optical transmitter, as designed to have a resonance bandwidth of approximately 1.2 GHz, will have a grating arm length $L_1$ of about 461 microns, yielding a $\kappa L$ product of about 2.69. For a ratio of optical energy escape from the short grating arm of this resonator to the optical energy escape from the long arm of this resonator of about 200:1, the length of the long arm of this resonator is about 913 microns, which corresponds to an a factor of 1.98. The evanescent coupling strength between this resonator and the center waveguide, here specified as being straight and running parallel to the resonator, must be 1.95 cm$^{-1}$. The corresponding inner-wall to inner-wall separation between waveguides is thus about 3.30 microns.

A design of the resonant optical reflector having this same resonance linewidth is then given as follows. The evanescent coupling strength between this reflector resonator and the center waveguide, again which is straight and runs parallel to this resonator, must be about 3.38 cm$^{-1}$. The corresponding inner-wall to inner-wall separation between waveguides is thus about 2.95 $\mu$m. In order that the p-parameter of the reflector resonator be 250, as chosen to return most of the optical energy of the resonator to the center waveguide, the grating arm lengths from the quarter-wave-shift to the grating end, $L_2$, must each be about 898 $\mu$m long.

To implement an arc-shape tapered bus waveguide with a sweep angle of approximately 15 degrees between the quarter-wave shift and the end of the grating of the reflector resonator, a radius R of 3469 microns is chosen. The estimated radiation loss over the arc length is essentially zero. The arc radius is corrected to a length of 3514 so as to ensure that at 1.557 microns wavelength an integral multiple of half-wavelengths plus one quarter of a wavelength is accrued between the quarter-wave shifts of the receiver (transmitter) and reflector resonators, and moreover so that the grating corrugations of the two resonators remain in lock-step to within one-half of a grating period.

In order to maintain the linewidth of the resonances of the receiver (transmitter) and reflector grating resonators in light of the tapered center waveguide, the resonator waveguides must be moved closer to the center bus waveguide so as to couple more strongly. The new required peak coupling strengths for the receiver (transmitter) and reflector grating resonators are 6.46 and 11.12 cm$^{-1}$, respectively, as calculated using Eqns. (14) and (15) above. The corresponding inner-wall to inner-wall separations are 2.50 and 2.15 microns, respectively, as calculated using Eqn. (16)

It is estimated from the tapered-bus design of the channel-add or channel-drop filter above that the CDF will cause an approximately 0.12 dB loss in transmission intensity of all non-resonant channels through the filter as the non-extracted channels propagate along the center waveguide, and at the receiver output waveguide will have approximately a 21.5 dB contrast between the peak intensity level of the received signal power and the out-of-stopband optical power which couples to the receiver output waveguide via normal evanescent waveguide-waveguide coupling.

Turning to the example interferometric switch design, in this example implementation the interferometric switch is designed with an assumption that waveguide design for the interferometer is the same as the design of the center waveguides. One means to create a phase controller is to pattern a resistive metallic strip on the upper cladding layer of an otherwise completed device, placed directly above one of the two waveguide interferometer arms between the two coupler regions. By injecting electric current through the resistive metallic strip, the strip can be heated to thereby induce a small relative change in the effective refractive index of the underlying optical mode. One can reasonably assume that the relative change in effective refractive index between the two interferometric waveguide arms is about 0.00025. The length of the interferometric arms to induce a $\pi$ phase relative phase shift must therefore be at least about 3100 $\mu$m-long. To avoid any coupling between these two waveguides across this distance, the waveguide-waveguide separation in the interferometric region should be in excess of about 10 $\mu$m. In practice, a separation in excess of about 50 $\mu$m can be preferable to ensure that the heating of one waveguide can be performed without significant heating of the second waveguide. Consider for the following remaining design considerations that the waveguide-waveguide separation at both the input and output of either 50/50 evanescent coupler is about 200 $\mu$m.

For the example implementation design of the 50/50 coupling regions, the coupling separation (inner-wall to inner-wall) is chosen to be 2.50 $\mu$m, which gives an estimated mode admixture of about 2%, as calculated from transverse field profiles and non-orthogonal coupled mode theory. A wider separation than this requires a longer coupling region while a shorter separation suffers more mode admixture. One might reasonably take the propagation loss of the optical mode as it transverses the waveguides is about 0.2 dB/cm. Moreover, the $\bar{d}$ parameter of Eqn. (50) above is approximately 1.98 micron$^{-1}$, as calculated based on the effective stack refractive indices of the bus waveguide. Combining the path-length loss immediately above with the radiation loss along the bend as given functionally in a preceding paragraph, and using Eqns. (52–55) above, one finds that the least total loss through the coupler for the 2.50 $\mu$m coupling separation is with a radius of about 950 $\mu$m. The optimal bend angle is then 17.5 degrees with a parallel coupling length $L_c$ of about 1025 $\mu$m-long. The total path length through the coupler is about 3427 $\mu$m, giving a total estimated loss of 0.72 dB.

Turning now to various optional features of the add/drop switch design provided by the invention, it is to be understood that such features may be preferable for specific applications of the switch and its operation. In all cases, it is preferable that the waveguides which thread through the Bragg gratings be tapered. The figures referred to in the following discussion illustrate straight, rather than tapered, waveguides only for clarity.

Figure 13:
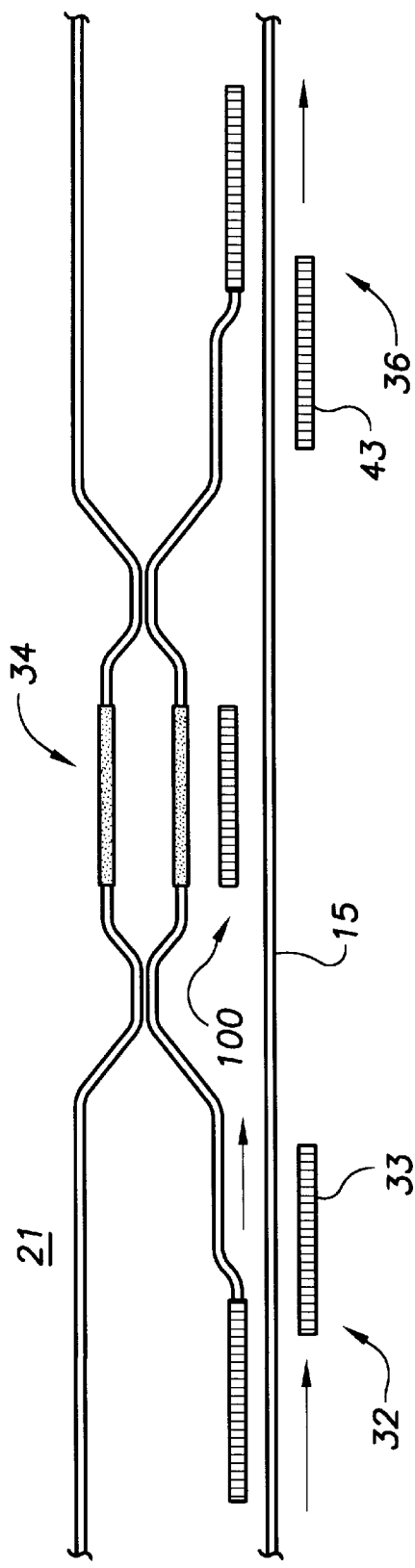
FIG. 13 is a schematic diagram of an add/drop switch including a loss resonator in accordance with the invention.

A first additional feature of the switch provided by the invention, shown in FIG. 13, is embodied as an additional Bragg grating 100 located adjacent to a section 15 of the first waveguide beyond the CDF 32. The additional Bragg resonator 100 functions as an optical loss resonator, tuned to the dropped channel, for coupling from the waveguide section 15 any incidental optical energy corresponding to the dropped channel and dissipating that energy to the substrate 21 on which the switch is fabricated. This is achieved by purposefully designing the grating arms to be sufficiently short in length that substantial optical energy can escape from the ends of the arms. With this design, it is ensured that any unintended nonideal performance of the CDF is compensated for and that the waveguide section 15 preceding the CAF 36 is truly free of the dropped channel.

Figure 14:
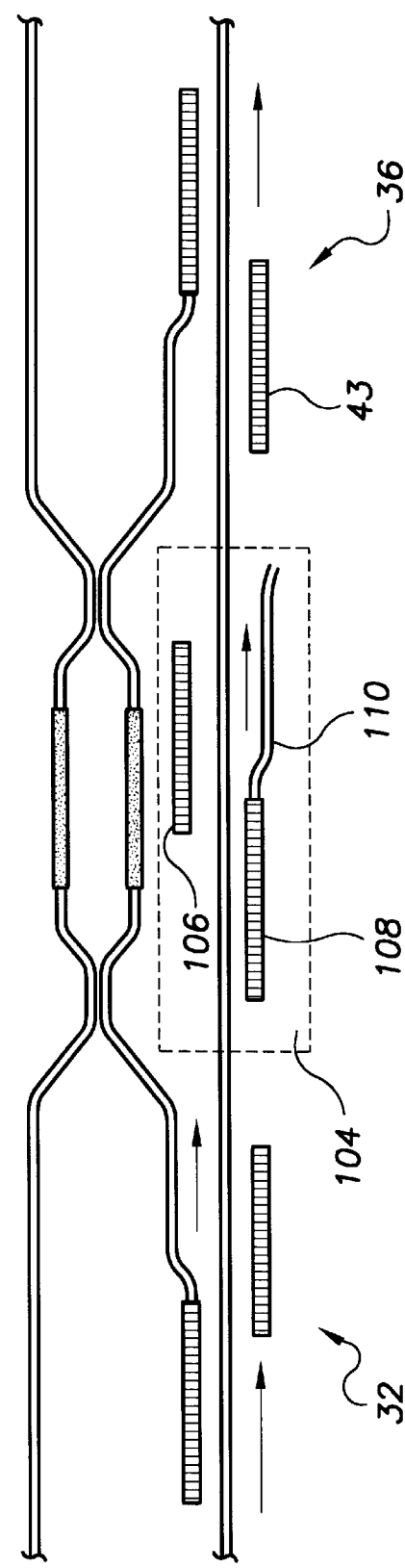
FIG. 14 is a schematic diagram of an add/drop switch including multiple channel-dropping filters in accordance with the invention.

In an alternative configuration, shown in FIG. 14, the additional Bragg grating 100 is replaced with a full second CDF 104, including a reflector Bragg grating 106 and a receiver Bragg grating 108. The two gratings here are designed to each be identical to the corresponding grating of the first CDF 32. A branching waveguide I 10 connected to the receiver Bragg grating 108 enables "dumping" of any collected incidental dropped-channel energy to an additional port of the switch (not shown), or to the substrate. This additional CDF configuration ensures full extinction of the dropped channel and may be preferable in applications were any interference between the dropped channel and a new data stream to be added would be particularly deleterious. As can be recognized, in an alternative configuration, the reflector resonator 43 of the CAF 36 can be employed with an additional receiver resonator 108 to form a second CDF as long as the optical path length between the reflector resonator 43 and the receiver 108 is equal to a net quarter wave shift., without the need for an additional reflector resonator. More than one additional CDF can be provided between the first CDF and the CAF for ensuring full extinction of the dropped channel.

Figure 15:
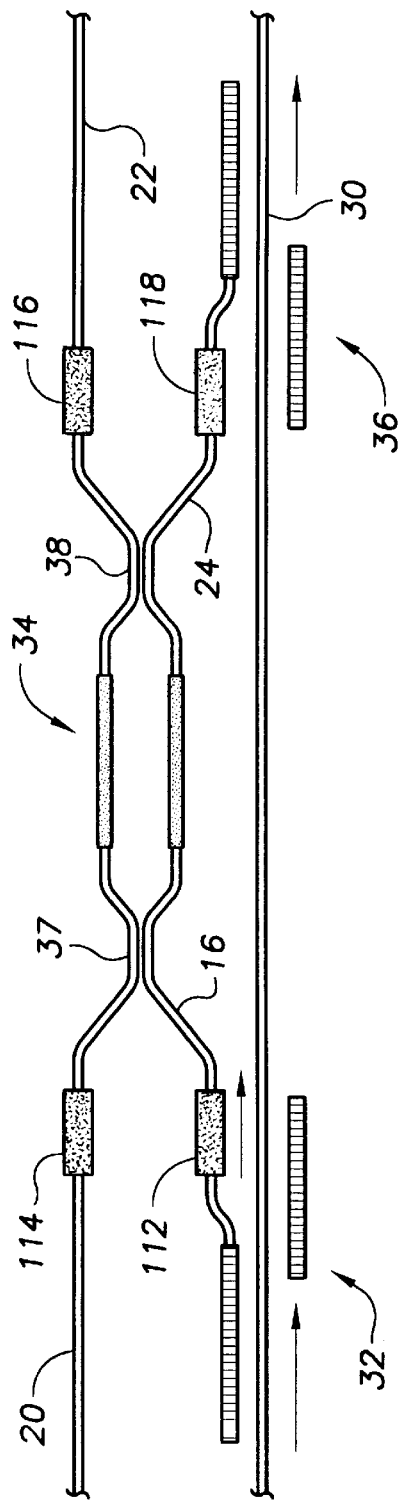
FIG. 15 is a schematic diagram of an add/drop switch including one or more gain elements in accordance with the invention.

In a further configuration in accordance with the invention, shown in FIG. 15, one or more optical gain elements 112, 114, 116, 118, can be included in the first branching waveguide 16, the second input waveguide 20, the second output waveguide 22, and the second branching waveguide 24. Any combination of the four gain elements can be employed. In an example application for use with only the first gain element 112, that gain element is set to produce a gain factor of 2. This is particularly useful in a network application of the add/drop switch where it is desired to tap a selected channel off of the network while at the same time maintaining that channel's transmission in the network.

This can be accomplished when the first gain element 112 is set to produce a gain factor of 2 and the phase controllers 44, 46 of the interferometric switch are adjusted such that a channel dropped by the CDF 32 is split by the interferometric switch to produce equal optical outputs on the second output waveguide 22 and the second branching waveguide 24. This results in full-intensity adding of the dropped channel back with the copropagating channels in the first output waveguide 30 as well as tapping of the dropped channel, at substantially full-intensity, out of the second output waveguide 22.

In a further example application of gain elements, here the gain element 116 in the second output waveguide 22 and the gain element 118 in the second branching waveguide 24 are employed. When the interferometric switch is set to the line state for enabling switch operation such that a dropped channel is added back to the first output waveguide 30, the branching gain element 118 can be set at some amplification factor to amplify the dropped channel, for, e.g., boosting the level of the dropped channel for further transmission. The second output waveguide gain element 116 can here be turned "off," in which state this element functions as an absorber and absorbs any incidental optical energy corresponding to the dropped channel that might undesirably be output to the second output waveguide 22. Similarly, in the cross state of the add/drop switch, the second output waveguide gain element 1 16 can be set to some amplification factor for amplifying the dropped channel, and the second branching waveguide gain element 118 can be turned "off" to ensure that no optical energy from the dropped channel is added back to the first output waveguide 30.

As can be recognized, these example amplification scenarios can be accomplished with other combinations of the four gain elements shown in FIG. 15, and the invention contemplates employing these gain elements, as well as others, in other locations of the add/drop switch. In general, the gain elements facilitate the line and cross state capabilities of the add/drop switch.

Figure 16:
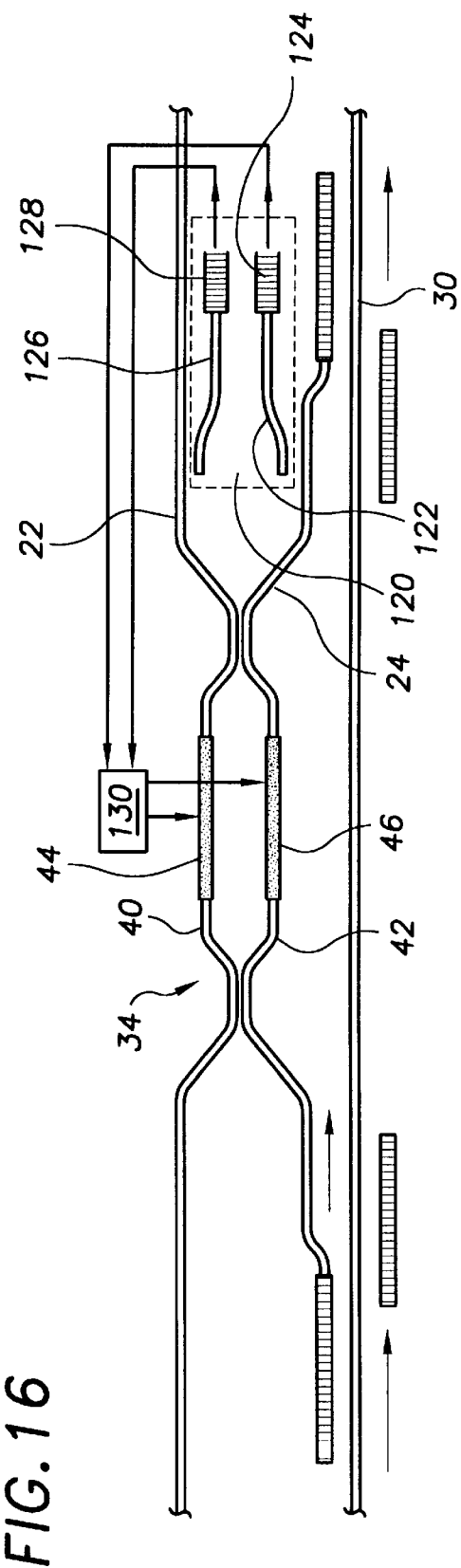
FIG. 16 is a schematic diagram of an add/drop switch including detector waveguides and corresponding photodetectors and a feedback phase control loop for controlling the state of an interferometric switch in accordance with the invention.

A further configuration for the add/drop switch is provided by the invention for closed-loop control of the state of the interferometric switch, as shown in FIG. 16. Here a switch state monitor configuration 120 is included to monitor the intensity of optical energy output by the interferometric switch 34 to the branching waveguide 24 relative to the output to the second output waveguide 22. This is accomplished, in one example, using two additional, weakly-coupled waveguides, a first 122 located to evanescently couple optical energy from the branching waveguide 24 and deliver that energy to a first photodetector 124. Similarly, a second waveguide 126 is located to evanescently couple optical energy from the second output waveguide 22 and deliver that energy to a second photodetector 128. Metal-semiconductor-metal photodetectors can be employed when the substrate of the add/drop switch is a direct bandgap semiconductor material.

The photodetectors convert the coupled optical energy to corresponding electrical signals, and deliver those signals to a controller 130, shown only schematically, and which, like the photodetectors, can be a distinct component that is not integrated with the add/drop switch substrate. The controller 130 compares the two photodetector signals to measure the state of the coupling balance between the two spatial interferometer outputs, and correspondingly, its two arms 40, 42, and based on this measured coupling state, controls the phase controllers 44, 46, respectively, of the two arms, to maintain a specified desired coupling state for a given add/drop switch application. As can be recognized from the previous description of switch operation, the state of the switch can be changed over time for various network operations and configurations, and thus the coupling balance controller 130 is accordingly preferably provided with temporal input control to accordingly adjust the state of interferometric switch.

Figure 17:
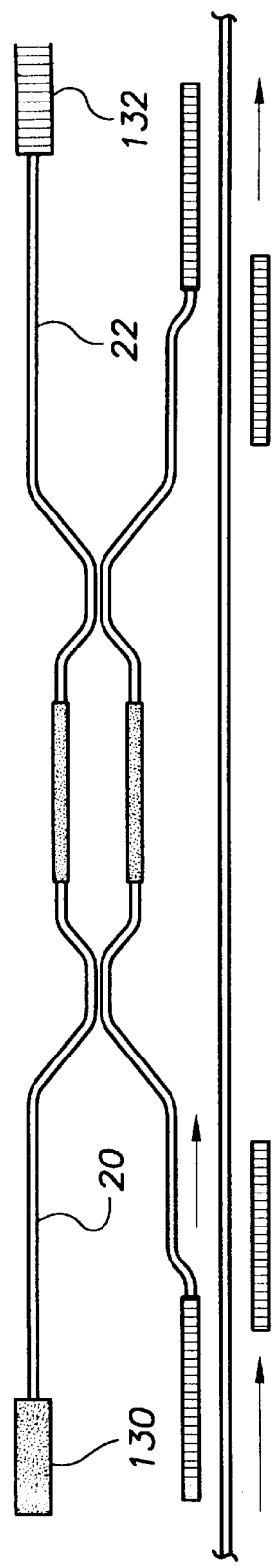
FIG. 17 is a schematic diagram of an add/drop switch including an integrated laser/modulator at a second input port and an integrated photodetector at a second output port, in accordance with the invention.

Turning to other alternative components of the add/drop switch, and referring to FIG. 17, there is shown an integrated laser/modulator 130 connected at the input to the second input waveguide 20 for introducing a substitute data stream for a dropped channel in the manner previously described. At the output of the second output waveguide 22 is provided an integrated photodetector 132, e.g., a metal-semiconductor-metal photodetector. The integration of a laser/modulator and photodetector for the second input and output waveguides circumvents the need for external fiber alignments and process control for coordinating the input and detection of the secondary data stream. The laser/modulator and photodetector can otherwise be located external to the add/drop switch substrate with appropriate interconnections to the substrate waveguides.

Figure 18:
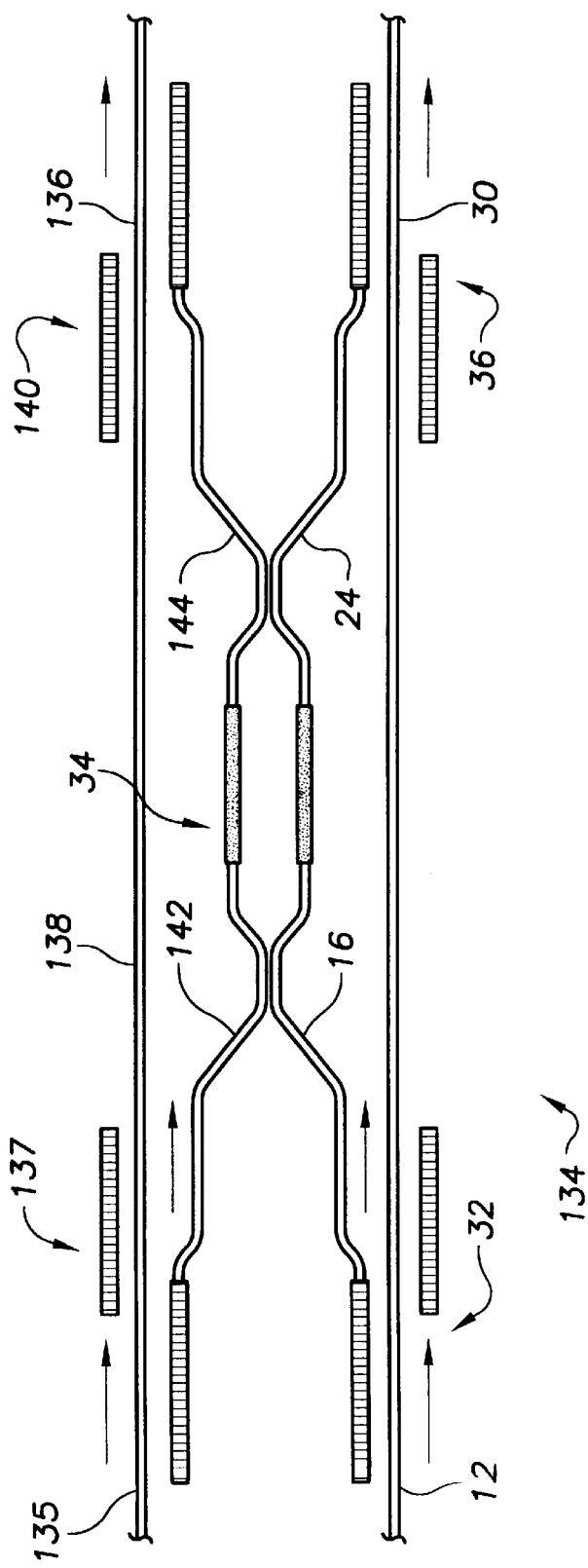
FIG. 18 is a schematic diagram of a dual-bus add/drop switch channel exchange configuration in accordance with the invention.

It is here noted that any of the various add/drop switch features and components described above, as well as a waveguide taper design, can be combined to produce an add/drop switch having selected functionality for a given application. The add/drop switch configuration can further be expanded to enable more extensive optical network operations. For example, turning to FIG. 18, there is shown a dual-line add/drop switch 134 in accordance with the invention. This dual-line switch enables exchanging of two different data streams of a common wavelength channel between two independent optical networks. Such data stream exchange can be employed, for example, between two optical LANs in a multi-LAN network having wavelength-selective user nodes on various of the LANs.

As shown in the figure, the dual-line switch includes two add/drop switches, the first including a first input waveguide 12, first output waveguide 30, first CDF 32, and first CAF 36. As in the previous embodiments, branching waveguides 16, 24, connect the output of the CDF 32 and the input to the CAF 36, respectively, to an interferometric switch 34. The Bragg gratings of the first CDF 32 and CAF 36 all correspond to an optical channel of interest. The second add/drop switch includes a second input waveguide 135, second output waveguide 136, second CDF 137, and second CAF 140. Branching waveguides 142, 144, connect the output of the CDF 137 and the input to the CAF 140, respectively, to the interferometric switch 34. The Bragg gratings of the second CDF 137 and CAF 140 also correspond to the wavelength band of the optical channel of interest.

In operation, the first CDF 32 drops a first data stream at the selected channel from the first input waveguide 12, corresponding to, e.g., a first LAN bus. Based on the state of the interferometric switch 34, the dropped channel is either added back to the first output waveguide 30 for transmission back on the first LAN bus, or is directed by way of the second add/drop switch branching waveguide 144 to the second output waveguide 136 for transmission on a second LAN bus. Similarly, the second CDF 137 drops a second data stream at the selected channel from the second input waveguide 135, corresponding to the second LAN bus. Again based on the state of the interferometric switch 34, the second dropped channel is either added back to the second output waveguide 136 for transmission back on the second LAN bus, or is directed by way of the first add/drop switch branching waveguide 24 to the first output waveguide 30 for transmission on the second LAN bus. With this controllable shifting capability, a channel from the first LAN bus can be shifted to the second LAN bus and if desired, replaced on the first LAN bus by a data stream at the same channel from the second LAN bus.

It is to be recognized that the add/drop switch of the invention can be implemented in a wide range of configurations different from the CDF/CAF-based configurations described above. All that is required is an ability to extract one channel of interest from a plurality of copropagating channels without requiring spatial separation of the full range of channels, and an ability to spatially switch the extracted channel between more than one output port based on the condition of the spatial switch control which is controlled, e.g., in relation to injection of a second data stream at the same channel.

Figure 19:
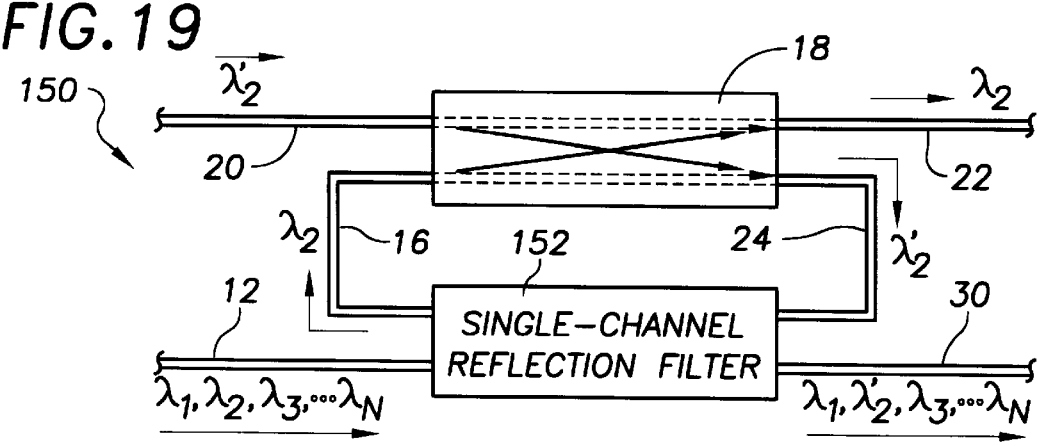
FIG. 19 is a schematic diagram of a second class of add/drop switches provided by the invention.

Turning to FIG. 19, in an example class of alternative add/drop switch configurations in accordance with the invention, the add/drop switch 150 is here configured with one four-port reflection filter 152 that replaces the CDF and CAF of the previous configurations. Input to the add/drop switch of a plurality of channels, $\lambda_1, \ldots, \lambda_N$, along the input waveguide 12 is directed to the reflection filter 152, which preferably is a single-channel reflection filter, i.e., a filter that reflects and spatially separates a selected channel from the input while allowing the remaining input channels to continue copropagation. Given an example where the $\lambda_2$ channel is the channel of interest, the reflection filter is adapted to reflect the $\lambda_2$ channel and transmit the other channels. The reflected $\lambda_2$ channel is directed by a branching waveguide 16 to the input of a spatial switch 18.

In a manner like that previously described, the spatial switch 18 is configured to accept from a second input waveguide 20 a second data stream $\lambda_2'$, indicated here to be of the same wavelength as the reflected channel but optionally of a differing data stream. The two channels are configured by the spatial switch to be output from that switch in either a line state, in which the $\lambda_2'$ channel is directed to a second output waveguide 22 and the $\lambda_2$ channel is directed back to the reflection filter 152 by way of a second branching waveguide 24; or a cross state, as shown in the figure, in which the $\lambda_2$ channel is directed to the second output waveguide 22 and the $\lambda_2'$ channel is directed via branching waveguide 24 to the reflection filter 152. In either state, that channel which is directed by the spatial switch to the reflection filter 152 is reflected by the filter to the first output waveguide 30 where it is added to the copropagating channels.

Figure 20:
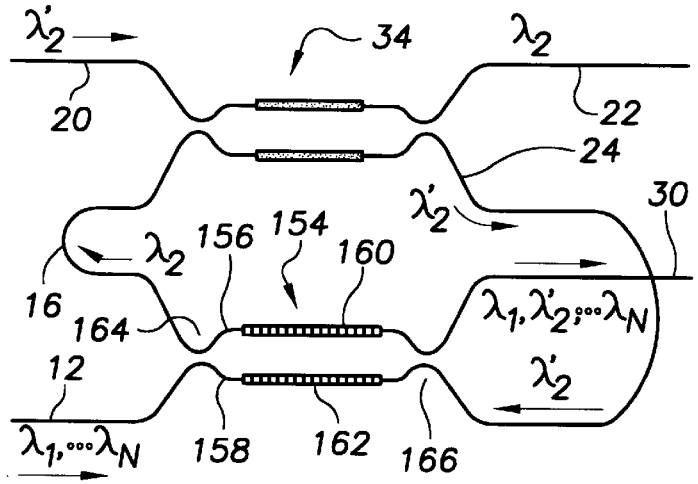
FIG. 20 is a schematic diagram of a first example implementation of the second class of add/drop switches of FIG. 19.

A first embodiment of this class of add/drop switches is shown in FIG. 20. Here the single-channel reflection filter 152 is realized as a two-arm interferometer 154. Each of the arms 156, 158, of this interferometer includes a Bragg grating 160, 162, respectively, that is each designed based on the channel of interest to be switched, in the example shown in the figure that being the $\lambda_2$ channel. Coupling regions 164, 166, are provided at the ends of the two interferometer grating arms. The first branching waveguide 16 connects the upper arm 156 to the input of an interferometer switch 34, while the second branching waveguide 24 connects the output of the interferometer switch 34 to the lower arm 158.

When a plurality of channels $\lambda_1, \ldots, \lambda_N$, is input at the input waveguide 12, the optical energy in the channels is split by the first coupler 164 to the interferometer waveguide arms 156 and 158. The selected channel, e.g., the $\lambda_2$ channel, is reflected by both gratings 160 and 162, and is recombined through the first coupling region 164 to the branching waveguide 16. The remaining channels travel through the grating 160, 162, to be recombined by the second coupler 166 to the first output waveguide 30. The reflected channel is then directed via the branching waveguide 16 to the interferometer switch 34. As explained above, the interferometric switch 34 can direct the reflected $\lambda_2$ channel and a second $\lambda_2'$ data steam to either a second output waveguide 22 or a second branching waveguide 24. The channel that is directed to the second branching waveguide 24, e.g., the $\lambda_2'$ channel, as shown in the figure, is directed to the second coupling region 166 of the grating interferometer 154. The channel energy is split by the second coupling region 166 onto the two interferometer waveguides 156, 158, reflected by the Bragg gratings 160, 162, and recombined through the second coupling region 166, to copropagate with the remaining channels to the first output waveguide 30.

This dual-interferometer configuration can be adapted for ease of device processing by fabricating each interferometer on a separate substrate and interfacing the waveguide sections on each substrate with appropriate couplers. Such a hybrid configuration can be employed where, e.g., it is preferable to fabricate the interferometer arm gratings in a distinct fabrication process flow from that of the interferometer switch.

Figure 21:
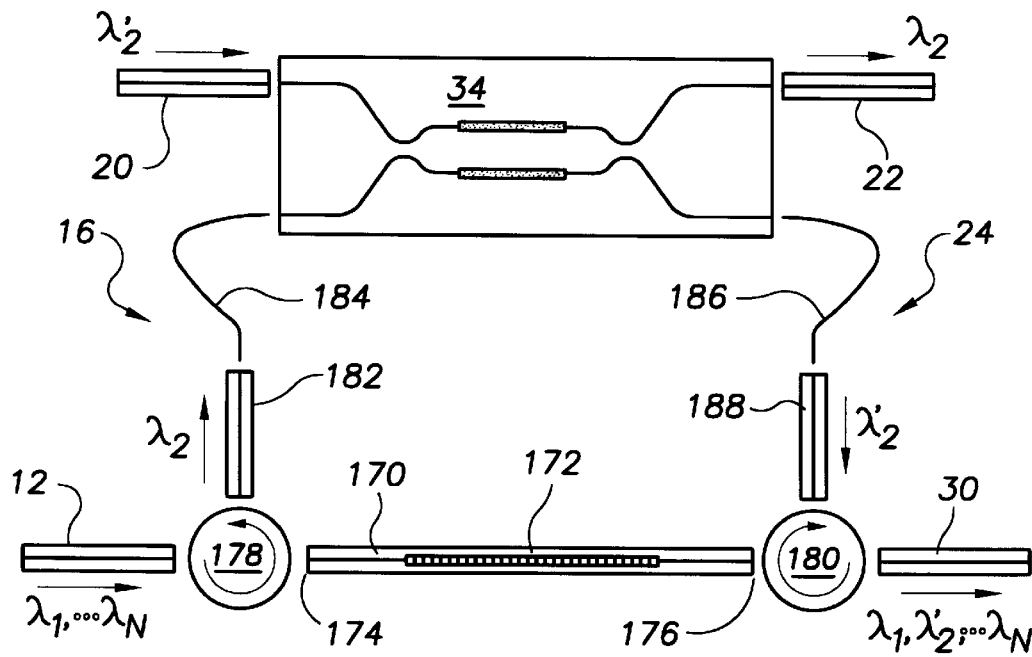
FIG. 21 is a schematic diagram of a second example implementation of the second class of add/drop switches of FIG. 19.

A second embodiment of the alternative add/drop switch class is shown in FIG. 21. Here the grating interferometer is replaced with a length of optical fiber 170 along a portion of which a Bragg grating 172 is patterned. The Bragg grating is designed to correspond to a channel of interest, e.g., the $\lambda_2$ channel. The first end 174 and second end 176 of the fiber 170 are each terminated at corresponding optical circulators 178, 180, respectively. The first branching waveguide 16 here includes a fiber section 182 coupled to the first circulator 178 and a second section 184 that can be integrated on a substrate with its interconnection to the interferometric switch 34. Similarly, the second branching waveguide 24 here includes a section 186 interconnected with an output of the interferometric switch 34 and a fiber section 188 coupled to the second circulator 180.

In operation of the add/drop switch, input of a plurality of channels, $\lambda_1, \ldots, \lambda_N$, along the input waveguide 12, here a length of fiber, is directed by the first circulator 178 to the grating fiber 170. The grating 172 of that fiber 170 reflects the selected channel, e.g., the $\lambda_2$ channel, back toward the first circulator 178. The remaining channels propagate through the grating 172 to the second fiber end 176. The first circulator 178 spatially separates forwardly transmitting and backwardly reflecting channels such that the reflected $\lambda_2$ channel is directed to the branching waveguide 16 while the other channels transmit through the fiber length 170.

The reflected $\lambda_2$ channel is directed to the interferometric switch 34 which operates in the manner already described, enabling switching between the output waveguide 22 and the branching waveguide 24 for the reflected $\lambda_2$ channel and a second, $\lambda_2'$ channel, input on a second input waveguide 20. The channel that is directed to the branching waveguide 24, e.g., the $\lambda_2'$ channel, in the scenario shown in the figure, is directed to the second circulator 180, which in turn directs it back to the fiber length 170. The grating 172 reflects the $\lambda_2$ channel back to the second circulator 180, which adds it to the copropagating channels on the output waveguide 30.

An example design of a Bragg reflector formed on a fiber length is given here. A Bragg reflector, unlike the receiver, transmitter, and reflector resonators described above, employs no phase shifts along its length; the grating period is instead uniform across the extend of the grating. Recall that a Bragg grating is characterized by its period, $\zeta$, its grating strength, $\kappa$, and its duty cycle, D, the last being defined by the corrugation length divided by the grating period length. Additionally, the waveguide that supports the grating has an effective modal refractive index and an effective modal group refractive index, corresponding to the phase and group velocities of the light in the waveguides, respectively. The grating period is chosen to correspond to the center wavelength of the wavelength band to be extracted by the reflector, using Eqn. (1) given above.

The Bragg grating of grating strength K is reflective over a band of wavelengths, called the stopband width. The stopband width in frequency, $\Delta v$, is given by the equation $\Delta v = \kappa v_g/\pi$, where $v_g$ is the optical group velocity. The necessary grating strength to reflect only one wavelength band out of a plurality of wavelength bands depends on the bandwidth of the channel. For example, the channel bandwidth may be 10 GHz, in which case the grating stopband might be 15 GHz wide. Using the preceding equation, a grating strength of about 5 cm$^{-1}$ is given as being necessary. The grating waveguide design must be revamped from the previous implementation example to ensure phase-velocity matching to the waveguides of the interferometer arms. It can be noted, however, that with such a low grating strength, almost no correction to waveguide width is necessary. Moreover, a fiber grating as fabricated in the usual manner does not usually allow for specific control of the average effective refractive index in the grating region.

The intensity reflectivity of a Bragg grating of length L is given by $|\Gamma|^2 = \tanh \kappa L$, where $\Gamma$ is the reflection amplitude. To enable a 99.5% reflection at the Bragg wavelength, given a grating strength of 5 cm$^{-1}$, the corresponding grating length is preferably about 6682 $\mu$m. Side-lobe reduction can be achieved as the grating strength is varied across the length of the grating, where maximum grating strength appears at the center and minimum grating strength appears at the grating ends. The grating depth and/or grating duty cycle can be varied to achieve this result. The grating length, however, must be increased accordingly, to maintain the reflectivity at the Bragg wavelength.

A fiber grating reflector can be designed using the preceding criteria. As is conventional, the grating image is patterned directly onto, e.g.,. a germanium-doped fiber core by exposure to UV light. Usually, the fiber core is first loaded with hydrogen to catalyze a UV-induced photorefractive index shift. The grating pattern is created via interferometric lithography where a standing-wave grating pattern is created at the core surface by either exposure through an appropriately design phase mask or direct exposure to two interfering beams of light incident at the appropriate angles. The grating reflectivity can be monitored during exposure to ensure proper spectral performance. After exposure, the excess hydrogen can be removed by heating the fiber.

This add/drop switch embodiment employs several modular components that are not integrally fabricated, and accordingly illustrates the breadth of fabrication embodiments contemplated by the invention. Indeed, it is to be recognized that beyond the alternative add/drop switch class just described, many other implementations of the switch can be realized.

While the various add/drop switch configurations discussed above are generally directed to routing of one optical channel, the configurations can also be adapted for multi-channel routing. For example, a cascade of add/drop switches, each dedicated to a distinct wavelength, can be interconnected hybrid-wise or integrally fabricated on one substrate to enable local dropping and adding of more than one optical channel. In an alternative configuration, multiple add/drop switches, each dedicated to a distinct channel, can be together fabricated in a nested fashion to enable dropping and adding of the multiple channels within one large multi-channel device. Such cascade and nested configurations enable a custom multi-channel routing where, e.g., a single user node on an optical LAN is interested in access to several, but not all, of the channels transmitted on the LAN; only the channels of interest need be considered for the configuration, whereby the switch is more efficient than conventional switches that resolve all transmitted channels.

As can be recognized, there are many applications for the add/drop switch of the invention beyond the optical ring LAN explicitly shown in FIG. 1. Indeed, the add/drop switch of the invention can be employed in any WDM optical network configuration, e.g., LAN, WAN, or other configuration, for wavelength-selective channel extraction.

From the foregoing, it is apparent that the wavelength-selective, add/drop optical switch of the invention and described above not only provides reliable and adaptable wavelength-selective channel routing and switching, but can do so with any in a range of equally efficient implementations that all enable a compact and correspondingly cost-effective device. This in turn furthers the practical realization of wide-range optical communications networks that employ user-specific wavelength channel transmission. The invention also provides a particularly elegant fabrication process for producing the add/drop switch implementations. It is recognized, of course, that those skilled in the art may make various modifications and additions to the embodiments described above without departing from the spirit and scope of the present contribution to the art. Accordingly, it is to be understood that the protection sought to be afforded hereby should be deemed to extend to the subject matter claims and all equivalents thereof fairly within the scope of the invention.

We claim:

1. A wavelength-selective optical switch comprising:
    a first input port for accepting a plurality of copropagating optical channels, each channel of a distinct wavelength band;
    a first output port;
    a second output port;
    wavelength-selective optical filter means connected to receive the copropagating optical channels from the first input port to extract a selected one of the channels while allowing remaining channels to copropagate to the first output port; and
    an interferometric switch connected to receive the selected extracted channel and comprising control means for controlling propagation of the selected extracted channel to at least one of the second output port and the optical filter means;
    the optical filter means being connected to receive from the interferometric switch an optical channel to combine the received channel with the remaining copropagating channels and direct the combined channels to the first output port.

2. The optical switch of claim I wherein the interferometric switch is adapted, in a first control state of the control means, to direct the selected extracted channel to the optical filter means; and
    wherein the interferometric switch is adapted, in a second control state of the control means, to direct the selected extracted channel to the second output port.

3. The optical switch of claim 2 further comprising a second input port for accepting an injected optical channel having a wavelength band corresponding to the wavelength band of the selected extracted channel, the second input port connected to direct the injected optical channel to the interferometric switch; and
    wherein the interferometric switch is adapted, in the second control state of the control means, to direct the injected channel to the optical filter means, and wherein the interferometric switch is adapted to direct the injected channel, in a first control state of the control means, to the second output port.

4. The optical switch of claim 3 wherein the interferometric switch comprises a first waveguide coupling region, a second waveguide coupling region, and first and second interferometer arms connected between the first and second waveguide coupling regions, with the first waveguide coupling region having a first waveguide connected to accept the selected extracted channel from the optical filter means and a second waveguide connected to accept an injected channel from the second input port, and with the second coupling region having a third waveguide connected to direct one of the injected channel and the selected extracted channel to the optical filter means and a fourth waveguide connected to direct one of the injected channel and the selected extracted channel to the second output port.

5. The optical switch of claim 4 wherein the control means comprises an optical phase controller in communication with at least one of the first and second interferometer arms.

6. The optical switch of claim 5 wherein the phase controller is adapted to impose, in the first control state, a first selected relative phase shift between optical channels propagating on the first and second interferometer arms, the first selected relative phase shift resulting in directing of the selected extracted channel to the optical filter means from the interferometer switch, and wherein the phase controller is adapted to impose, in the second control state, a second selected relative phase shift between channels propagating on the first and second interferometer arms, the second selected relative phase shift resulting in directing of the selected extracted channel to the second output port from the interferometer switch.

7. The optical switch of claim 4 wherein the optical filter means comprises:
    a first optical filter connected to receive the copropagating optical channels from the first input port to extract the selected channel and direct the extracted selected channel to the first waveguide of the first interferometric switch coupling region while allowing the remaining channels to copropagate through the first optical filter; and
    a second optical filter connected to receive the remaining channels that copropagate through the first optical filter, the second optical filter also connected to receive from the third waveguide of the second interferometric switch coupling region one of the selected extracted channel and the injected channel to combine the received channel with the remaining copropagating channels, and connected to direct the combined channels to the first output port.

8. The optical switch of claim 7 wherein the first optical filter comprises:
    a first center waveguide connected to the first input port;
    a first optical receiver resonator located in side-by-side evanescent coupling proximity to the first center waveguide, and connected to the first waveguide of the first interferometric switch coupling region; and a first optical reflector resonator located in side-by-side evanescent coupling proximity to the first center waveguide following the first optical receiver resonator, an optical path length along the first center waveguide of an integral multiple of half-resonant wavelengths plus one quarter resonant wavelength being defined between a phase reference point on the first receiver resonator and an equivalent phase reference point on the first reflector resonator; and wherein the second optical filter comprises:

a second center waveguide connected at a first end to receive the remaining copropagating channels from the first center waveguide and connected at a second end to the first output port;

a second optical reflector resonator located in side-by-side evanescent coupling proximity to the second waveguide; and an optical transmitter resonator connected to the third waveguide of the second interferometric switch coupling region and located in side-by-side evanescent coupling proximity to the second waveguide following the second optical reflector resonator, an optical path length along the second center waveguide of an integral multiple of half-resonant wavelengths plus one quarter resonant wavelength being defined between a phase reference point on the second reflector resonator and an equivalent phase reference point on the transmitter resonator.

9. The optical switch of claim 8 wherein the first and second optical reflector resonators, the first receiver resonator, and the transmitter resonator each comprises a Bragg grating characterized by a grating period and a Bragg wavelength selected to correspond to the wavelength band of the selected extracted channel, with the phase reference point of the Bragg grating comprising a spacer portion at a point along that grating for producing a quarter-wave shift in an optical phase of an optical channel that propagates along that grating.

10. The optical switch of claim 9 wherein the Bragg grating of each of the first and second optical reflector resonators, the first receiver resonator, and the transmitter resonator is characterized by a resonant spectral linewidth that is at least as wide as the wavelength band of the selected extracted channel but that does not substantially overlap with the wavelength band of each optical channel adjacent to the selected extracted channel in the plurality of channels.

11. The optical switch of claim 10 wherein the proximity of each of the first optical reflector resonator and the first receiver resonator Bragg gratings to the first center waveguide is characterized by a minimum proximity for that grating corresponding to the point along that grating at which the quarter-wave shift spacer portion is located; and wherein the proximity of each of the second optical reflector resonator and the transmitter resonator Bragg gratings to the second center waveguide is characterized by a minimum proximity for that grating corresponding to the point along that grating at which the quarter-wave shift spacer portion is located.

12. The optical switch of claim 9 wherein the first and second reflector resonator Bragg gratings, the first receiver resonator Bragg grating, and the transmitter Bragg grating each comprises a periodic grating located on a top surface of a corresponding grating waveguide, and wherein each Bragg grating and each corresponding Bragg grating waveguide is fabricated in a process comprising the steps of:

forming a lower cladding dielectric layer on a substrate;

forming a core dielectric layer on the lower cladding dielectric layer, the core dielectric layer having a higher refractive index than the lower cladding dielectric layer;

forming on the core dielectric layer a lithographically-defined pattern corresponding to the Bragg gratings;

forming on the patterned core dielectric layer a first hard mask layer having a lithographically-defined pattern corresponding to the Bragg grating pattern;

forming a second hard mask layer on the patterned first hard mask layer, the first and second hard mask layers being formed of materials that are each characterized as being etchable by an etching process that does not etch the other hard mask material or the core layer;

lithographically patterning the second hard mask layer in a pattern that corresponds to the grating waveguides and that is aligned to the Bragg grating pattern on the first hard mask layer;

etching the first hard mask layer, using the second hard mask layer mask pattern, to expose an upper surface of the core layer in regions of the core layer not covered by a waveguide pattern of the second hard mask while preserving the first hard mask layer in all regions of the first hard mask layer covered by the waveguide pattern of the second hard mask;

etching the core dielectric layer to produce grating waveguides under the layered first and second patterned hard mask layers;

stripping the second hard mask layer;

etching the core layer waveguides to produce Bragg gratings on the waveguides;

stripping the first hard mask layer; and forming an upper cladding dielectric layer on the etched core layer, the upper cladding dielectric layer having a lower index of refraction than the core dielectric layer.

13. The optical switch of claim 12 wherein in the process for fabricating waveguides and gratings the step of forming on the core layer a lithographic pattern corresponding to the Bragg gratings comprises the steps of:

forming a photoresist layer on the core layer; and exposing the photoresist layer to x-rays through an x-ray mask having a grating pattern produced on the mask by spatial-phase-locked e-beam lithography.

14. The optical switch of claim 12 wherein in the process for fabricating waveguides and gratings the step of forming on the core layer a lithographic pattern corresponding to the Bragg gratings comprises the steps of:

forming a photoresist layer on the core layer; and exposing the photoresist layer to optical energy of at least optical wavelengths through an optical phase mask having a grating pattern produced on the mask by spatial-phase-locked e-beam lithography.

15. The optical switch of claim 12 wherein the upper and lower cladding dielectric layers each comprises a layer of indium phosphide and wherein the core layer comprises at least one layer of indium gallium arsenide phosphide.

16. The optical switch of claim 12 wherein the substrate comprises a material selected from the group of silicon, quartz, and sapphire; wherein the upper and lower cladding dielectric layers each comprises a layer of material of substantially silicon dioxide; and wherein the core dielectric layer comprises a layer of material selected from phosphorus-doped and germanium-doped silicon dioxide.

17. The optical switch of claim 9 further comprising an optical loss resonator Bragg grating located in side-by-side evanescent coupling proximity to the second center waveguide between the first reflector resonator and the second reflector resonator, the loss resonator Bragg grating having a Bragg period corresponding to the wavelength band of the selected extracted channel and having a spacer portion at a point along that grating for producing a quarter-wave shift in an optical phase of an optical channel that propagates along that grating, each grating length on either side of the spacer portion being characterized by a grating arm length that is sufficiently short to enable optical energy coupled to the grating arms to escape from an outer end of the arm.

18. The optical switch of claim 9 further comprising a third optical filter comprising:

a second optical receiver resonator located in side-by-side evanescent coupling proximity to the second center waveguide between the first and second optical reflector resonators; and a third optical reflector resonator located in side-by-side evanescent coupling proximity to the second center waveguide following the second optical receiver resonator and before the second optical reflector resonator, an optical path length along the second center waveguide of an integral multiple of half-resonant wavelengths plus one quarter resonant wavelength being defined between a phase reference point on the second receiver resonator and an equivalent phase reference point on the third reflector resonator;

the second receiver resonator and the third reflector resonator each comprising a Bragg grating characterized by a grating period and a Bragg wavelength selected to correspond to the wavelength band of the selected extracted channel, with the phase reference point of the Bragg grating comprising a spacer portion at a point along that grating for producing a quarter-wave shift in an optical phase of an optical channel that propagates along that grating.

19. The optical switch of claim 9 further comprising a third optical filter comprising:

a second optical receiver resonator located in side-by-side evanescent coupling proximity to the second center waveguide between the first and second optical reflector resonators; and the second optical reflector resonator, an optical path length along the second center waveguide of an integral multiple of half-resonant wavelengths plus one quarter resonant wavelength being defined between a phase reference point on the second receiver resonator and an equivalent phase reference point on the second reflector resonator;

the second receiver resonator comprising a Bragg grating characterized by a grating period and a Bragg wavelength selected to correspond to the wavelength band of the selected extracted channel, with the phase reference point of the Bragg grating comprising a spacer portion at a point along that grating for producing a quarter-wave shift in an optical phase of an optical channel that propagates along that grating.

20. The optical switch of claim 9 further comprising amplifying means connected to at least one of the first, second, third, and fourth coupling waveguides of the interferometric switch coupling regions.

21. The optical switch of claim 5 further comprising:

a first detector waveguide located in side-by-side evanescent coupling proximity to the third coupling waveguide of the second coupling region of the interferometric switch;

a first photodetector connected to the first detector waveguide for producing a first signal corresponding to intensity characteristics of light coupled to the first detector waveguide;

a second detector waveguide located in side-by-side evanescent coupling proximity to the fourth coupling waveguide of the second coupling region of the interferometric switch;

a second photodetector connected to the second detector waveguide for producing a second signal corresponding to intensity characteristics of light coupled to the second detector waveguide; and second control means for controlling the phase controller of the interferometric switch based on the first and second photodetector signals.

22. The optical switch of claim 4 wherein the optical filter means comprises a single-channel interferometric reflection filter comprising a first waveguide coupling region, a second waveguide coupling region, and first and second interferometer arms connected between the first and second waveguide coupling regions, each arm having an identical Bragg reflector characterized by a selected Bragg period corresponding to the wavelength band of the selected channel to be extracted, with the first waveguide coupling region having a first waveguide connected to accept from the first input port the copropagating channels and a second waveguide connected to deliver the selected extracted channel to the first waveguide of the first coupling region of the interferometric switch, and with the second coupling region having a third waveguide connected to accept one of the selected extracted channel and the injected channel from the third waveguide of the second coupling region of the interferometric switch and a fourth waveguide connected to direct the copropagating channels and one of the injected channel and the selected extracted channel to the second output port, with the first waveguide of the reflection filter first coupling region and the fourth waveguide of the reflection filter second coupling region being connected by one of the two reflection filter arms.

23. The optical switch of claim 4 wherein the optical filter means comprises:

a length of optical waveguiding fiber having a Bragg reflector along the fiber length, the reflector characterized by a selected Bragg period corresponding to the wavelength band of the selected channel to be extracted;

a first optical circulator having a first port connected to receive the copropagating channels from the first input port, a second port connected to a first end of the optical fiber length, and a third port connected to the first waveguide of the first coupling region of the interferometric switch;

a second optical circulator having a first port connected to the first output port, a second port connected to a second end of the optical fiber, and a third port connected to the third waveguide of the second coupling region of the interferometric switch;

wherein for each of the first and second optical circulators, optical input to the first port and optical input to the third port is directed to the second port, while reflection at the second port of an optical input from the first port is directed to the third port, and reflection at the second port of an optical input from the third port is directed to the first port, whereby the plurality of copropagating channels from the first input port are directed to the fiber first fiber end by the first circulator, the selected channel to be extracted is reflected to the first fiber end and directed by the first circulator to the first waveguide of the first interferometric switch coupling region, and a channel from the third waveguide of the interferometric switch second coupling region is directed by the second circulator to the second fiber end, reflected with the remaining copropagating channels to the second circulator, and directed by the second circulator to the first output port.

24. The optical switch of claim 3 wherein the first input port and the first output port each comprises a connection to a first optical communication bus on which the plurality of optical channels copropagate and from which the selected channel is extracted.

25. The optical switch of claim 24 wherein the second input port and the second output port each comprises a connection to a second optical communication bus on which a plurality of optical channels copropagate and from which the injected optical channel is extracted.

26. A method for switching a selected optical channel on a waveguide on which a plurality of optical channels are copropagating, each of the copropagating optical channels of a distinct wavelength band, the method comprising:

directing the copropagating optical channels to wavelength-selective optical filter means adapted to extract the selected channel while allowing remaining channels to copropagate on the waveguide; and directing the extracted selected channel to an interferometric switch comprising control means that adapts the interferometric switch, in a first control state of the control means, to direct the selected extracted channel to the optical filter means for recombining with the copropagating optical channels on the waveguide, and that adapts the interferometric switch, in a second control state of the control means, to direct the selected extracted channel to a second waveguide.

27. The method of claim 26 further comprising the steps of:

extracting an optical channel from the second waveguide;

directing the optical channel extracted from the second waveguide to the interferometric switch; and enforcing the first control state of the control means of the interferometric switch to direct the optical channel extracted from the second waveguide back to the second waveguide and to direct the selected extracted channel to the optical filter means for recombining with the copropagating optical channels on the first waveguide.

28. The method of claim 26 further comprising the steps of:

extracting an optical channel from the second waveguide;

directing the optical channel extracted from the second waveguide to the interferometric switch; and enforcing the second control state of the control means of the interferometric switch to direct the selected extracted channel to the second waveguide and to direct the optical channel extracted from the second waveguide to the optical filter means for combining with the copropagating optical channels on the first waveguide.

* * * * *